United States Patent
Norris et al.

(10) Patent No.: US 11,632,470 B2
(45) Date of Patent: *Apr. 18, 2023

(54) METHODS AND APPARATUS TO ASSIST LISTENERS IN DISTINGUISHING BETWEEN ELECTRONICALLY GENERATED BINAURAL SOUND AND PHYSICAL ENVIRONMENT SOUND

(71) Applicants: Glen A. Norris, Lakewood, OH (US); Philip Scott Lyren, Wadsworth, OH (US)

(72) Inventors: Glen A. Norris, Lakewood, OH (US); Philip Scott Lyren, Wadsworth, OH (US)

(*) Notice: Subject to any disclaimer, the term of this patent is extended or adjusted under 35 U.S.C. 154(b) by 0 days.

This patent is subject to a terminal disclaimer.

(21) Appl. No.: 17/693,389

(22) Filed: Mar. 13, 2022

(65) Prior Publication Data
US 2022/0201126 A1    Jun. 23, 2022

Related U.S. Application Data

(63) Continuation of application No. 17/113,053, filed on Dec. 6, 2020, now Pat. No. 11,277,519, which is a continuation of application No. 16/558,082, filed on Aug. 31, 2019, now Pat. No. 10,863,032, which is a continuation of application No. 16/271,784, filed on Feb. 9, 2019, now Pat. No. 10,432,796, which is a continuation of application No. 15/944,797, filed on Apr. 4, 2018, now Pat. No. 10,225,410, which is a continuation of application No. 15/619,418, filed on Jun. 9, 2017, now Pat. No. 9,998,606.

(Continued)

(51) Int. Cl.
*H04R 5/00*     (2006.01)
*H04M 3/56*    (2006.01)
*G10L 21/028*  (2013.01)
*H04S 1/00*     (2006.01)
*H04S 7/00*     (2006.01)
*G06F 3/01*     (2006.01)
*G06F 3/16*     (2006.01)

(52) U.S. Cl.
CPC ............. *H04M 3/568* (2013.01); *G06F 3/011* (2013.01); *G06F 3/017* (2013.01); *G06F 3/165* (2013.01); *G10L 21/028* (2013.01); *H04S 1/005* (2013.01); *H04S 7/302* (2013.01); *H04S 7/304* (2013.01); *H04S 7/305* (2013.01); *H04S 7/306* (2013.01); *H04S 2400/11* (2013.01); *H04S 2400/13* (2013.01); *H04S 2420/01* (2013.01)

(58) Field of Classification Search
CPC ........ H04M 3/568; G06F 3/011; G06F 3/017; G06F 3/165; G10L 21/028; H04S 1/005; H04S 7/302; H04S 7/304; H04S 7/305
See application file for complete search history.

(56) References Cited

U.S. PATENT DOCUMENTS

| | | | |
|---|---|---|---|
| 11,277,519 B2* | 3/2022 | Norris | H04S 7/304 |
| 2009/0122995 A1* | 5/2009 | Kim | G10L 21/028 |
| | | | 381/17 |
| 2015/0373477 A1* | 12/2015 | Norris | H04M 1/72457 |
| | | | 381/303 |

* cited by examiner

*Primary Examiner* — Ammar T Hamid

(57) ABSTRACT

Methods and apparatus assist listeners in distinguishing between electronically generated binaural sound and physical environment sound while the listener wears a wearable electronic device that provides the binaural sound to the listener. The wearable electronic device generates a visual alert or audio alert when the electronically generated binaural sound occurs.

20 Claims, 12 Drawing Sheets

---

Convolve, with a processor, a voice of a user with sound localization information (SLI) so the voice of the user externally localizes to a listener as electronically generated binaural sound that is at least three feet away from the listener.
100

↓

Provide, with a wearable electronic device, the voice of the user as the electronically generated binaural sound that externally localizes to the listener.
110

↓

Provide, with the wearable electronic device, an alert that signifies to the listener that the electronically generated binaural sound is the voice of the user to enable the listener to distinguish between the electronically generated binaural sound and physical environment sound.
120

Related U.S. Application Data

(60) Provisional application No. 62/348,166, filed on Jun. 10, 2016.

Convolve, with a processor, a voice of a user with sound localization information (SLI) so the voice of the user externally localizes to a listener as electronically generated binaural sound that is at least three feet away from the listener.
100

Provide, with a wearable electronic device, the voice of the user as the electronically generated binaural sound that externally localizes to the listener.
110

Provide, with the wearable electronic device, an alert that signifies to the listener that the electronically generated binaural sound is the voice of the user to enable the listener to distinguish between the electronically generated binaural sound and physical environment sound.
120

Figure 1

Detect, while a listener wears a wearable electronic device, physical environment sound and/or electronically generated binaural sound.
200

Sound detected?
210

No / Yes

Provide a visual and/or audio alert to the listener of the physical environment sound and/or electronically generated binaural sound or take another action.
220

Figure 2

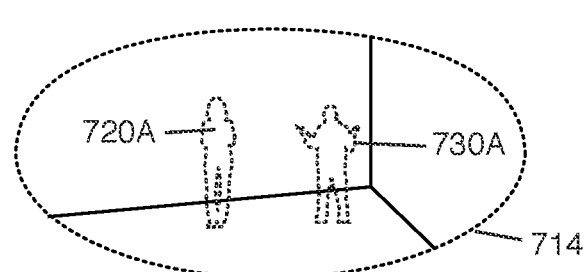
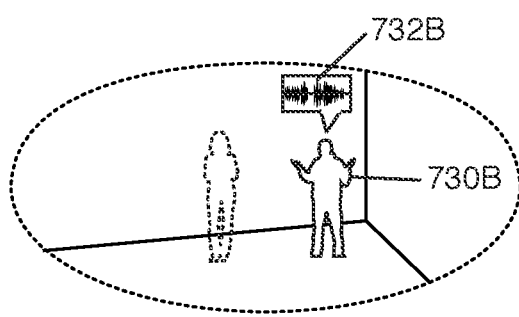
Figure 7A
Figure 7B
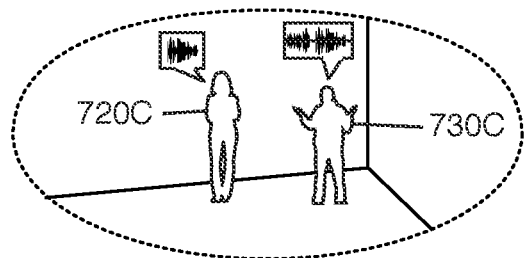
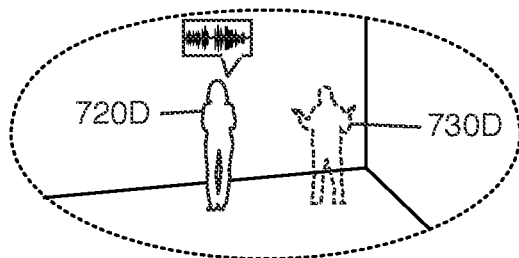
Figure 7C
Figure 7D

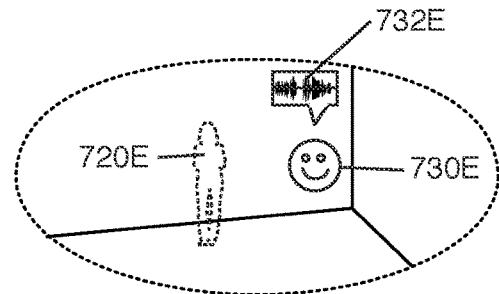
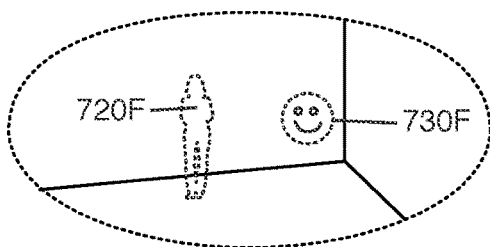
Figure 7E
Figure 7F
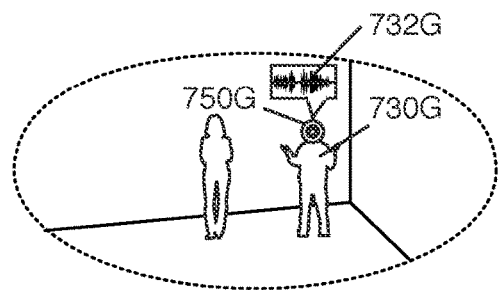
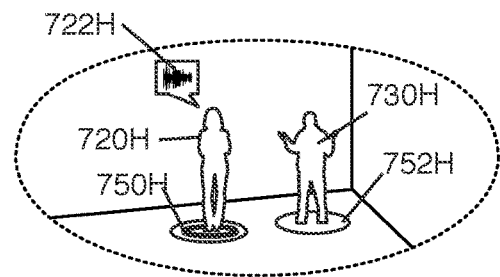
Figure 7G
Figure 7H

METHODS AND APPARATUS TO ASSIST LISTENERS IN DISTINGUISHING BETWEEN ELECTRONICALLY GENERATED BINAURAL SOUND AND PHYSICAL ENVIRONMENT SOUND

BACKGROUND

Three-dimensional (3D) sound localization offers people a wealth of new technological avenues to not merely communicate with each other but also to communicate more efficiently with electronic devices, software programs, and processes.

As this technology develops, challenges will arise with regard to how sound localization integrates into the modern era. Example embodiments offer solutions to some of these challenges and assist in providing technological advancements in methods and apparatus using 3D sound localization.

SUMMARY

Methods and apparatus assist listeners in distinguishing between electronically generated binaural sound and physical environment sound while the listener wears a wearable electronic device that provides the binaural sound to the listener. The wearable electronic device generates a visual alert or audio alert when the electronically generated binaural sound occurs.

Other example embodiments are discussed herein.

BRIEF DESCRIPTION OF THE DRAWINGS

FIG. 1 is a method that provides an alert to a listener to enable the listener to distinguish between electronically generated binaural sound and physical environment sound in accordance with an example embodiment.

FIG. 2 is a method that provides an alert to a listener to enable the listener to distinguish between electronically generated binaural sound and physical environment sound in accordance with an example embodiment.

FIGS. 7A-7J show an electronic system with fields-of-view of a listener wearing a WED or HMD during a telephone call or other communication with a user in accordance with an example embodiment.

DETAILED DESCRIPTION

Figure 3:
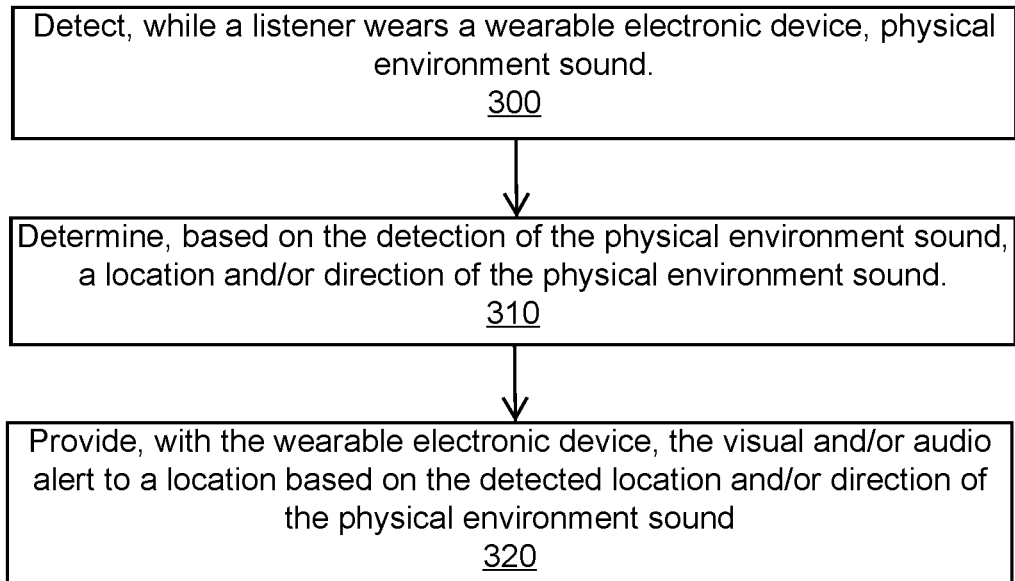
FIG. 3 is a method that provides an alert to a listener to enable the listener to distinguish between electronically generated binaural sound and physical environment sound in accordance with an example embodiment.

Example embodiments include methods and apparatus that assist listeners in distinguishing between electronically generated binaural sound and physical environment sound.

An alert provides a person with audio and/or visual information to assist or to enable the person in distinguishing between electronically generated binaural sound and physical environment sound that the person hears. Often, the person simultaneously hears these two types of sounds, hears them in close succession, or hears them mixed together and is unable to distinguish between them.

Example embodiments solve these problems and other problems discussed herein.

Example embodiments solve other problems with regard to playing or providing alerts to people so they can distinguish electronically generated binaural sound or binaural audio from physical environment sound or unaltered naturally occurring sound. For example, consider the following problems: How long should an alert be played or provided to the person? Where should the alert be played or provided to the person? What type of alert should be played or provided to the person? When in time should the alert be played or provided to the person? How often or frequently should the alert be played or provided to the person?

By way of introduction, sound localization refers to a person's ability to determine a location or an origin of sound in direction and distance (though the human auditory system has limits in determining direction and distances to some sounds). Sound localization also refers to methods to use artificial or computer generated auditory cues to generate an origin of sound in a virtual 3D space. Binaural sound (or 3D sound) and some forms of stereo sound provide a listener with the ability to localize sound; though binaural sound provides a listener with a superior ability to localize sounds in 3D space. In many instances, a person listening to binaural sound through an electronic device (such as earphones or speakers with cross-talk cancellation) can determine a location from where the sound originates even when this location is away from the person. In some instances, a person listening to binaural sound can determine both a direction and a distance to an origin of the sound.

Binaural sound has amazing new technological opportunities in augmented reality (AR), virtual reality (VR), audio augmented reality (AAR), gaming, and telecommunications. For example, when talking to another person over a Voice over Internet Protocol (Vo IP) call, a voice of the other person could appear to originate from a position that is several feet in front of the listener. As another example, sounds in a virtual reality (VR) software game can appear to originate at different locations around a user in 3D space when the user wears a head mounted display (HMD) or optical head mounted display (OHMD).

One technical challenge is that binaural sound can emulate natural sound from the listener's physical environment and in some instances be indistinguishable from natural sound. A listener can be confused or unable to determine whether a sound is an electronically originating binaural sound that augments a listener's reality (AR sound) or a naturally occurring binaural sound from the physical environment around the listener, such as a sound from a person, animal, or other natural sound that occurs within a listener's audible environment. This confusion or inability to distinguish between physical environment (PE) sounds and electronic binaural sounds (e.g., binaural sounds provided to a user through an electronic device) is not desirable in many situations. Example embodiments solve these technical problems and others.

The set of sound localization points and the binaural space surrounding a person can function as a three-dimensional audio interface. Some of the sounds a listener hears are sounds originating in his physical environment (PE) and are localized with human binaural cues to the point of the origin of the sound. A listener can also localize other sounds having binaural cues that are intentionally arranged, or captured from PE sound originating in another place away from the listener. Sounds having binaural cues that are not the result of a listener's physical environment can be added to, overlaid on, or augment to his binaural experience or his audial space as augmented reality (AR) sound. A listener can localize PE sound and AR sound simultaneously.

In some situations, a listener may need to distinguish sound localizations he or she perceives, namely localizations produced naturally in his physical environment (PE) corresponding to sound origination events occurring in his or her PE, from localizations triggered by sound augmenting his or her reality (e.g., electronic binaural sound).

Loudspeakers can produce PE sound that localizes to the position of the loudspeaker. Properly arranged loudspeakers (relative to the position of a listener) playing binaural sound can produce AR localizations to a listener that do not correspond to the position of a loudspeaker. A listener in the room with the loudspeakers can hear both PE sound and AR sound. Earphones can provide AR sound. In addition, earphones with mic-through capability can deliver both PE sounds and AR sounds through the earphones' drivers without distinction, such that the listener is unable to distinguish between the originations of the sound. Confusion as well as life endangerment can result from a listener's failure to distinguish PE sound from AR sound (aka electronically generated binaural sound or electronic binaural sound). Example embodiments solve these problems and other problems.

People hear human audial cues (for example ITD, ILD, etc.) to determine for objects in their environment, and the environment itself, positions, sizes, shapes, material composition, surface properties, and more. By using binaural sound to present human audial cues, objects, spaces, and their properties can be added to a listener's acoustic space. An example embodiment provides additional audial cues to AR sound and PE sound that humans can rely on to efficiently distinguish the AR sound from PE sound.

An example embodiment also provides other methods to distinguish between PE sound and AR sound, and methods for a listener to determine if his audial reality is being actively augmented, and is capable of being augmented.

When a person's audial environment is augmented, it may be achieved through ordinary comfortable earphones or headphones, or speakers. Because many types of earphones are comfortable enough to be worn throughout the day, and while sleeping, a user whose audial environment is augmented may fail to recall that he is wearing earphones. He may not recall that earphones are inserted in his ear canals, or that an audial component of an AR system is currently rendering sounds to his headphones, earphones, or speakers. Consequently, he may not realize that the augmented audial information he is hearing inaccurately corresponds to events in his physical environment. He may perceive or believe that objects, animals, speaking people, weather patterns, etc., are present with him, when they are not. In addition, he may have trouble or find himself unable to distinguish between his perceptions of PE sounds and AR sounds or other electronically generated sounds.

Similarly, a person who is fully aware that his reality is being augmented may falsely identify PE sound as AR sound (e.g., someone knowingly occupying a visually rendered chat space or game, or someone who has grown accustomed to an acoustically augmented or virtual reality). Both of these phenomena can result in confusion, hazardous scenarios, and danger to the listener or others around him.

In some instances, additional concern is warranted for wearers of custom in-ear monitor (CIEM) earphones molded to a wearer's pinnae and/or ear canal(s). These devices can be comfortably worn for extended periods or while sleeping. In order to improve the clarity of the sound they deliver to the wearer, they may have excellent isolation. However acoustic isolation from one's physical environment can be inconvenient, impractical, and dangerous. The complexity of the hazard is compounded for a listener who wears CIEMs with outward-facing microphones for binaural sound capture. An electronic system that has access to the CIEM microphones and drivers can allow the wearer to operate them in a "pass-through" or "mic-thru" mode. In the mic-thru mode, sounds from the wearer's environment are captured from microphones and delivered to the drivers as little as a few millimeters away. The sound can be amplified to a level intended to cause the wearer to perceive the sounds of his physical environment at the approximate volume of the sound occurring in the environment. The wearer can be left with an impression that he is not wearing earphones. A mic-thru feature can be turned on or off, causing his isolation to be active or inactive; and a wearer may not know the state of the mic-thru feature, or lose track of the state. If a wearer believes that he is insulated from PE sound when in fact he is not, he may falsely identify PE sound as AR sound. If a wearer believes that he is not insulated from PE sound (that he can hear PE sound) when in fact his mic-thru is not operating, he can mistake AR sound for PE sound (e.g. he can mistake an insulated experience for a quiet environment). For example, a listener wearing CIEMs acoustically isolated from PE sounds can still hear PE sounds via mic-thru. If his mic-thru system fails without his knowledge, he can fail to hear an important or urgent PE sound without knowing that he has failed to hear it.

Earphones for binaural communication with the convenience of selective (toggleable) isolation may be habitually worn for extended periods due to their comfort and frequent use throughout the day and/or night. A consequent problem exists because confusing or dangerous situations can arise. A listener wearing CIEMs with binaural microphones capable of operating in mic-thru mode can be unable to distinguish the many possible PE sounds (delivered to him binaurally through the earphones) from the many possible externalized binaural sounds (also delivered by his earphones) not originating in his physical environment.

An electronic system such as a sound localization system (SLS) can analyze, process, modify, or create sound prior to or as it is played to a listener. The electronic system can monitor or capture mic-thru sound for processing or modification. The electronic system can thus provide both PE sound and electronic binaural sound to the listener.

Mic-thru sound can be processed by the system before being delivered for output to the listener's earphones. For example, the electronic system can amplify the captured PE sound. The electronic system can also execute additional processes to modify the PE sound.

Consider an example in which a smartphone is coupled to earphones with outward-facing binaural mics, and the smartphone executes software that sends AR sound to the earphones. The smartphone also executes software that receives captured PE sound from the mics, processes the sound, and plays the sound to the earphones.

FIG. 1 is a method that provides an alert to a listener to enable the listener to distinguish between electronically generated binaural sound and physical environment sound in accordance with an example embodiment.

Block 100 states convolve, with a processor, a voice of a user with sound localization information (SLI) so the voice of the user externally localizes to a listener as electronically generated binaural sound that is at least three feet away from the listener.

One or more processors and/or electronic devices convolve the voice with sound localization information that includes, but is not limited to, one or more of head related transfer functions (HRTFs), head related impulse responses (HRIRs), interaural time differences (ITDs), interaural level differences (ILDs), room impulse responses (RIRs), and binaural room impulse responses (BRIRs).

For example, a processor (such as a digital signal processor or DSP) in a server or a handheld portable electronic device (HPED) processes the voice with SLI (including a pair of HRTFs). The listener hears the processed voice through a wearable electronic device, such as a head mounted display (HMD), optical head mounted display (OHMD), electronic glasses, a smartphone attached to a head mounted device, wireless or wired headphones or earphones. The processed voice localizes as binaural sound or 3D sound to the listener at a location that is a far-field distance from the listener, such as one meter or more away or three feet or more away from the listener.

By way of example, the sound localization information (SLI) are retrieved, obtained, or received from memory, a database, a file, an electronic device (such as a server, cloud-based storage, or another electronic device in the computer system or in communication with a PED providing the sound to the user through one or more networks), etc. For instance, the information includes one or more of HRTFs, ILDs, ITDs, and/or other information discussed herein. Instead of being retrieved from memory, this information can also be calculated in real-time.

An example embodiment processes and/or convolves sound with the SLI so the sound localizes to a particular area or point with respect to a user. The SLI required to process and/or convolve the sound is retrieved or determined based on a location of a desired sound localization point SLP. For example, if the SLP is to be located one meter in front of a face of the listener and slightly off to a right side of the listener, then an example embodiment retrieves the corresponding HRTFs, ITDs, and ILDs and convolves the sound to this location. The location can be more specific, such as a precise spherical coordinate location of (1.2 m, 25°, 15°), and the HRTFs, ITDs, and ILDs are retrieved that correspond to the location. For instance, the retrieved HRTFs have a coordinate location that matches or approximates the coordinate location where sound is desired to originate to the user. Alternatively, the location is not provided but the SLI is provided (e.g., a software application provides to the DSP HRTFs and other information to convolve the sound).

The SLP can also exist or coincide with a location of an object, a virtual reality (VR) image, or an augmented reality (AR) image. For example, a person wears a wearable electronic device that displays an AR or VR image that represents the user with whom the person communicates (e.g., during a telephone call, a VR software game, an AR software application, etc.). This image has a coordinate location with respect to the point-of-view of the person wearing the WED, such as having a three-dimensional coordinate location in a VR environment with respect to the person. The wearable electronic device convolves or processes the voice of the user with HRTFs having coordinate locations that match or approximate the three-dimensional coordinate location associated with the image. The listener externally localizes the voice of the user to the three-dimensional coordinate location where he or she understands or sees the image to be.

A central processing unit (CPU), processor (such as a DSP), or microprocessor processes and/or convolves the sound with the SLI, such as a pair of head related transfer functions (HRTFs), ITDs, and/or ILDs so that the sound will localize to a zone, area, or SLP. For example, the sound localizes to a specific point (e.g., localizing to point $(r, \theta, \phi)$) or a general location or area (e.g., localizing to far-field location $(\theta, \phi)$) or near-field location $(\theta, \phi)$)). Additionally, as noted, sound can be convolved or processed to localize to a VR or AR image.

The SLI can be stored in memory in the local electronic device (e.g., the HPED or wearable electronic device), a remote electronic device (e.g., a server in communication with the HPED or wearable electronic device), or another electronic device (e.g., a portable flash storage or a portable electronic device with wireless transmission capabilities). As an example, a lookup table that stores a set of HRTF pairs includes a field/column that specifies the coordinates associated with each pair, and the coordinates indicate the location for the origination of the sound. These coordinates include a distance (r) or near-field or far-field designation, an azimuth angle ($\theta$), and/or an elevation angle ($\phi$).

The complex and unique shape of the human pinnae transforms sound waves through spectral modifications as the sound waves enter the ear. These spectral modifications are a function of the position of the source of sound with respect to the ears along with the physical shape of the pinnae that together cause a unique set of modifications to the sound called head related transfer functions or HRTFs.

A unique pair of HRTFs (one for the left ear and one for the right ear) can be modeled or measured for each position of the source of sound with respect to a listener.

A HRTF is a function of frequency (f) and three spatial variables, by way of example $(r, \theta, \phi)$ in a spherical coordinate system. Here, r is the radial distance from a recording point where the sound is recorded or a distance from a listening point where the sound is heard to an origination or generation point of the sound; $\theta$ (theta) is the azimuth angle between a forward-facing user at the recording or listening point and the direction of the origination or generation point of the sound relative to the user; and $\phi$ (phi) is the polar angle, elevation, or elevation angle between a forward-facing user at the recording or listening point and the direction of the origination or generation point of the sound relative to the user. By way of example, the value of (r) can be a distance (such as a numeric value) from an origin of sound to a recording point (e.g., when the sound is recorded with microphones) or a distance from a SLP to a head of a listener (e.g., when the sound is generated with a computer program or otherwise provided to a listener).

When the distance (r) is greater than or equal to about one meter (1 m) as measured from the capture point (e.g., the head of the person) to the origination point of a sound, the sound attenuates inversely with the distance. One meter or thereabout defines a practical boundary between near-field and far-field distances and corresponding HRTFs. A "near-field" distance is one measured at about one meter or less; whereas a "far-field" distance is one measured at about one meter or more. Example embodiments are implemented with near-field and far-field distances.

The coordinates for external sound localization can be calculated or estimated from an interaural time difference (ITD) of the sound between two ears. ITD is related to the azimuth angle according to, for example, the Woodworth model that provides a frequency independent ray tracing methodology. The coordinates (r, θ, φ) for external sound localization can also be calculated from a measurement of an orientation of and a distance to the face of the person when a head related impulse response (HRIR) is captured.

The coordinates can also be calculated or extracted from one or more HRTF data files, for example by parsing known HRTF file formats, and/or HRTF file information. For example, HRTF data is stored as a set of angles that are provided in a file or header of a file (or in another predetermined or known location of a file or computer readable medium). The data can include one or more of time domain impulse responses (FIR filter coefficients), filter feedback coefficients, and an ITD value. This information can also be referred to as "a" and "b" coefficients. By way of example, these coefficients are stored or ordered according to lowest azimuth to highest azimuth for different elevation angles. The HRTF file can also include other information, such as the sampling rate, the number of elevation angles, the number of HRTFs stored, ITDs, a list of the elevation and azimuth angles, a unique identification for the HRTF pair, and other information. The data can be arranged according to one or more standard or proprietary file formats, such as AES69, and extracted from the file.

The coordinates and other HRTF information are calculated or extracted from the HRTF data files. A unique set of HRTF information (including r, θ, φ) is determined for each unique HRTF.

The coordinates and other HRTF information are also stored in and retrieved from memory, such as storing the information in a look-up table or other memory discussed herein. The information is quickly retrieved to enable real-time processing and convolving of sound using HRTFs and hence improves computer performance of execution of binaural sound.

The SLP represents a location where a person will perceive an origin of the sound. For an external localization, the SLP is away from the person (e.g., the SLP is away from but proximate to the person or away from but not proximate to the person). Further, this SLP can be located at a physical or tangible object (such as located at a chair or picture on a wall) or located in empty space or empty virtual space. The empty space can be void of an image (e.g., empty space located in front of a face of a listener) or included with an image (e.g., located in a VR environment that includes an image, such as at a VR object). The SLP can also be located inside the head of the person (e.g., when the sound is provided as mono sound or stereo sound).

A location of the SLP corresponds to the coordinates of one or more pairs of HRTFs, or corresponds to a coordinate location or zone where a listener perceives a localization due to the influence of a visual cue (e.g., an image, object, or device), or a known or understood location that is not visible (e.g., a recently witnessed or anticipated location of a SLP, a device that is out of a field-of-view, an avatar suddenly occluded by another virtual object).

For example, the coordinates of or within a SLP or a zone match or approximate the coordinates of a HRTF. Consider an example in which the coordinates for a pair of HRTFs are (r, θ, φ) and are provided as (1.2 meters, 35°, 10°). A corresponding SLP or zone intended for a person thus includes (r, θ, φ), provided as (1.2 meters, 35°, 10°). In other words, the person will localize the sound as occurring 1.2 meters from his or her face at an azimuth angle of 35° and at an elevation angle of 10° taken with respect to a forward-looking direction of the person. In the example, the coordinates of the SLP and HRTF match.

As another example, a listener perceives a SLP or sound from a sound source at a near-field physical object, and the HRTFs convolving the perceived sound have far-field coordinates along the line-of-sight from the head of the listener to the object. In this case, one or more of the SLP coordinates do not match the coordinates of the object (e.g., the r coordinates do not match). HRTF pairs having coordinates matching the coordinates of the object may be unavailable to the listener. Later as the listener localizes the sound to the object, a barrier is placed such that the listener is blocked from seeing the object. The listener continues to localize the sound to the object, with the object as the SLP because the listener remains aware that the object has not moved.

SLI can also be approximated or interpolated based on known data or known SLI, such as SLI for other coordinate locations. For example, a SLP is desired to localize at coordinate location (2.0 m, 0°, 40°), but HRTFs for the location are not known. HRTFs are known for two neighboring locations, such as known for (2.0 m, 0°, 35°) and (2.0 m, 0°, 45°), and the HRTFs for the desired location of (2.0 m, 0°, 40°) are approximated from the two known locations. These approximated HRTFs are provided to convolve sound to localize at the desired coordinate location (2.0 m, 0°, 40°).

Sound is convolved either directly in the time domain with a finite impulse response (FIR) filter or with a Fast Fourier Transform (FFT). For example, an electronic device convolves the sound to one or more SLPs using a set of HRTFs, HRIRs, BRIRs, or RIRs and provides the person with binaural sound.

In an example embodiment, convolution involves an audio input signal and one or more impulse responses of a sound originating from various positions with respect to the listener. The input signal is a limited length audio signal (such as a pre-recorded digital audio file) or an ongoing audio signal (such as sound from a microphone or streaming audio over the Internet from a continuous source). The impulse responses are a set of HRIRs, BRIRs, RIRs, etc.

Convolution applies one or more FIR filters to the input signals and convolves the input signals into binaural audio output or binaural stereo tracks. For example, the input signals are convolved into binaural audio output that is specific or individualized for the listener based on one or more of the impulse responses to the listener.

The FIR filters are derived binaural impulse responses that are executed with example embodiments discussed herein (e.g., derived from signals received through microphones placed in, at, or near the left and right ear channel entrance of the person). Alternatively or additionally, the FIR filters are obtained from another source, such as generated from a computer simulation or estimation, generated from a dummy head, retrieved from storage, etc. Further, convolution of an input signal into binaural output can include sound with one or more of reverberation, single echoes, frequency coloring, and spatial impression.

Processing of the sound also includes calculating and/or adjusting an interaural time difference (ITD), an interaural level difference (ILD), and/or other aspects of the sound in order to alter the cues and artificially alter the point of localization. Consider an example in which the ITD is calculated for a location (θ, φ) with discrete Fourier transforms (DFTs) calculated for the left and right ears. The ITD is located at the point for which the function attains its maximum value, known as the argument of the maximum or arg max as follows:

$$ITD = \arg\max(\tau) \sum_n d_{l,\theta,\phi}(n) \cdot d_{r,\theta,\phi}(n+\tau).$$

Subsequent sounds are filtered with the left HRTF, right HRTF, and/or ITD so that the sound localizes at (r, θ, φ). Such sounds include filtering stereo and monaural sound to localize at (r, θ, φ). For example, given an input signal as a monaural sound signal s(n), this sound is convolved to appear at (θ, φ) when the left ear is presented with:

$$s_l(n) = s(n - ITD) \cdot d_{l,\theta,\phi}(n);$$

and the right ear is presented with:

$$s_r(n) = s(n) \cdot d_{r,\theta,\phi}(n).$$

Consider an example in which a dedicated digital signal processor (DSP) executes frequency domain processing to generate real-time convolution of monophonic sound to binaural sound.

By way of example, a continuous audio input signal x(t) is convolved with a linear filter of an impulse response h(t) to generate an output signal y(t) as follows:

$$y(\tau) = x(\tau) \cdot h(\tau) = \int_0^\infty x(\tau - t) \cdot h(t) \cdot dt.$$

This reduces to a summation when the impulse response has a given length N and the input signal and the impulse response are sampled at t=iDt as follows:

$$y(i) = \sum_{j=0}^{N-1} x(i-j) \cdot h(j).$$

Execution time of convolution further reduces with a Fast Fourier Transform (FFT) algorithm and/or Inverse Fast Fourier Transform (IFFT) algorithm.

Consider another example of binaural synthesis in which recorded or synthesized sound is filtered with a binaural impulse response (e.g., HRIR or BRIR) to generate a binaural output sound to the person. The input sound is preprocessed to generate left and right audio streams that are mapped to one or more sound localization points (known as SLPs). These streams are convolved with a binaural impulse response for the left ear and the right ear to generate the left and right binaural output sound signal. The output sound signal is further processed depending on a final destination. For example, a cross-talk cancellation algorithm is applied to the output sound signal when it will be provided through loudspeakers or applying artificial binaural reverberation to provide 3D spatial context to the sound.

Example embodiments designate or include an object, image, point, or device on the ray that extends from a head of a listener to the intended SLP (such as displaying an image as or in line with the intended SLP). For an external localization, the SLP is away from the person (e.g., the SLP is away from but proximate to the person or away from but not proximate to the person). The SLP can also be located inside the head of the person (e.g., when sound is provided to the listener in stereo or mono sound).

Block 110 states provide, with a wearable electronic device, the voice of the user as the electronically generated binaural sound that externally localizes to the listener.

Binaural sound is provided to the listener through one or more electronic devices including, but not limited to, one or more of bone conduction headphones, speakers of a wearable electronic device (e.g., headphones, earphones, electronic glasses, earbuds, head mounted display, smartphone, etc.). Binaural sound can be processed for crosstalk cancellation and provided through other types of speakers (e.g., dipole stereo speakers).

From the point-of-view of the listener, the sound originates or emanates from the object, point, area, or location that corresponds with the SLP. For example, an example embodiment selects an intended SLP at, on, or near a physical object, a VR object, or an AR object (including locations behind the object). When the sound is convolved with HRTFs corresponding to the intended SLP (including HRTFs behind the intended SLP), then the sound appears to originate to the listener at the object.

When binaural sound is provided to the listener, the listener will hear the sound as if it originates from the SLP (e.g., a VR image or AR image). The sound, however, does not originate from the SLP since the SLP may be at an inanimate object with no electronics or an animate object with no electronics. For example, the SLP is an empty point in space approximately one meter away from the head of the listener. Alternatively, the SLP is designated at an object that has electronics but does not have the capability to generate sound (e.g., the SLP has no speakers or sound system). As yet another example, the object at a SLP has speakers and the ability to provide sound but is not providing sound to the listener. In each of these examples, the listener perceives the sound to originate from the object, but the object does not produce the sound. Instead, the sound is altered or convolved and provided to the listener so the sound appears to originate from the object.

Sound localization information (SLI) is stored and categorized in various formats. For example, tables or lookup tables store SLI for quick access and provide convolution instructions for sound. Information stored in tables expedites retrieval of stored information, reduces CPU time required for sound convolution, and reduces a number of instruction cycles. Storing SLI in tables also expedites and/or assists in prefetching, preprocessing, caching, and executing other example embodiments discussed herein. SLI can be stored in read only memory (ROM) or random access memory (RAM) of an electronic device that includes or does not include a table.

Consider an example in which a HPED determines an identity of a listener (e.g., with a biometric sensor such as one discussed herein) and retrieves HRTFs associated with the identified listener. These HRTFs are personalized or unique to the listener since every individual has a unique or special set of left and right HRTFs for a given coordinate location with respect to a head orientation of the individual.

For example, a listener logs in to a computer system or electronic device, and the computer system or electronic device retrieves from memory HRTFs unique to the identity of the listener. As another example, the listener speaks at the outset of a phone call, or in issuing a voice command to establish a voice communication, an electronic device or process in the computer system processes the voice in order to determine a voiceprint or voice-id of the listener. The voiceprint is used to lookup and specify or retrieve a HRTF set for the listener. As another example, a HPED captures, with a camera in the HPED, the face of a first user during telephony with a second user. Facial recognition software analyzes the facial image of the first user to determine his or her identity. Memory stores HRTFs for different users (e.g., personalized HRTFs or preferred HRTFs). Based on the identity of the user, the HPED retrieves far-field HRTFs that are assigned to the first user. A processor in the HPED or a process in a server in communication with the HPED convolves the voice of the second user with the selected far-field HRTFs.

Consider an example in which a telephony service or telecommunication provider stores thousands or millions of left and right HRTF pairs or HRTF sets that are each associated with many characteristics of a person or model from whom they were measured or calculated. In addition, each HRTF set is associated with many characteristics of one or more users for whom the HRTFs provide a high level of realism. The many characteristics can include aspects of a face captured from a camera (e.g., aspects used in the execution of facial recognition), aspects of a voice (such as aspects of voice that are assessed in voice identification), a height, weight, gender, race, age, ear shape, eye color, hairstyle, hair type, chest size, type of clothing (e.g., thick sweater or sheer blouse), type of sound that was, will be, or is often convolved for the person, and other data and biometrics. Taken together, these data are used to predict for a particular listener which of the large multiplicity of HRTFs stored by the service or provider in the cloud or memory are most likely to provide a high level of realism to the listener. A selection of an HRTF set based on the prediction is provided to an electronic device of the listener or otherwise executed to convolve sound for the listener. A level of satisfaction or realism is determined during the playing of the sound, and the determined level is used to adjust future predictions of HRTFs for the listener and other listeners.

Block 120 states provide, with a wearable electronic device, an alert that signifies to the listener that the electronically generated binaural sound is the voice of the user to enable the listener to distinguish between the electronically generated binaural sound and physical environment sound.

The alert includes one or more of visual alerts (e.g., alerts that the listener can see) and/or audio alerts (e.g., alerts that the listener can hear). The alert enables the listener to distinguish between hearing electronically generated binaural sounds and physical environment sounds. The alert can also be a tactile alert, such as a vibration or haptic feedback. For example, a listener configures a wrist-phone to ring at a SLP that is two meters away. There are many people with wrist-phones and HPEDs in the room with the listener. An example embodiment vibrates the wrist-phone of the listener during the playing of the binaural ringtone. This alerts the listener that the externalized sound of a ringing phone in the room two meters away is the wrist-phone of the listener.

Consider an example embodiment that generates an audible alert that includes, but is not limited to, one or more of a tone, a beep, a bang, a buzz, a voice, music, or a sound effect or audio effect. The audible alert also includes a recognizable audio tweak or sound, such as sound being played to the listener at a particular pitch, frequency, timbre, reverberation, word pace, syllabic tempo, play rate, resonance, color, spectral profile, or other qualities of a sound and their combinations.

Consider an example embodiment that generates a visual alert that includes, but is not limited to, one or more of flashing a light, providing a constant light, dimming a light (e.g., on an object or background), brightening a light (e.g., an object or background), providing a certain color light (e.g., providing a blue or green light on an object), displaying an object or animation, removing an object or animation, spinning or rotating an object or animation, moving an object or animation, changing a color of an object or background, adding or removing animation, speeding or slowing an animation, pausing or resuming an animation, enlarging a size of an object or animation, and reducing a size of an object or animation.

An example embodiment provides the alert at one or more of the following times: (1) when or before the electronically generated binaural sound commences or begins to play to the listener (e.g., at a point in time right before or when the listener hears the electronically generated binaural sound), (2) when the electronically generated binaural sound finishes or stops playing to the listener, (3) when the physical environment sound commences or begins to the listener (e.g., at a point in time when the listener begins to hear the physical environment sound), (4) when the physical environment sound finishes or stops to the listener, (5) while the electronically generated binaural sound plays to the listener, and (6) while the physical environment sound plays to the listener.

The duration of the alert can be short (e.g., less than a second) or longer (e.g., longer than a second). Further, the duration of time that the alert is provided to the listener can be based on an amount of time of the electronically generated binaural sound and/or physical environment sound. For example, provide the alert to the listener during or while the electronically generated binaural sound plays to the listener. As another example, provide the alert to the listener during or while the physical environment sound is present or exists. The volume of an audible alert can be low or high relative to the sound triggering the alert or relative to other sound (e.g., softer or louder than the sound triggering the alert, softer or louder than other sound playing, softer or louder than recent PE sounds, softer or louder than predicted PE or AR sound, softer or louder than average PE or AR sound). The volume and/or duration of an auditory alert, and the brightness, color and/or duration of a visual alert can correspond to the loudness of the sound that triggers the alert. For example, a bright red visual alert can correspond to a loud PE sound; a long auditory alert can correspond to a loud AR sound.

Example embodiments can be applied to hardware, software, and electronic devices that provide electronically generated binaural sound or 3D sound to listeners. By way of example, these applications include, but are not limited to, telephone calls or telephony, VR games and VR software applications (e.g., games and software applications that execute with a HMD or a smartphone being worn as a HMD), and AR games and AR software applications (e.g., games and software applications that execute with electronic glasses or a smartphone being worn on a head of a person).

FIG. 2 is a method that provides an alert to a listener to enable the listener to distinguish between electronically generated binaural sound and physical environment sound in accordance with an example embodiment.

Block 200 states detect, while a listener wears a wearable electronic device, physical environment sound and/or electronically generated binaural sound.

The wearable electronic device monitors for the existence of physical environment sound and/or electronically generated binaural sound.

For example, the wearable electronic device (or another electronic device in communication with the wearable electronic device) includes one or more sensors that detect the presence of the sound or the presence of a person or object that can make the sound. By way of example, these sensors include, but are not limited to, one or more of a single microphone, multiple microphones, a camera, a proximity sensor, radio frequency identification (RFID) sensor, motion sensor or motion detector, and a sound detector or sound sensor.

Electronically generated binaural sound does not necessarily have to be detected with a sensor since this sound can be electronically generated and wirelessly transmitted (e.g., generated with hardware and/or software). For example, a VR software application executing on a wearable electronic device generates 3D sound and provides this sound to the listener. This software application knows when in time this sound is or will be provided to the listener. As another example, the wearable electronic device includes a wireless transmitter and receiver that transmit and receive sounds or voice during a telephone call over the internet or other network. The wearable electronic device knows when in time this sound is being played via the wireless receiver during the telephone call.

Block 210 makes a determination as to whether the sound is detected.

If the answer to block 210 is "no" flow proceeds back to block 200.

If the answer to block 210 is "yes" flow proceeds to block 220 that states provide a visual and/or audio alert to the listener of the physical environment sound and/or electronically generated binaural sound, or take another action.

For example, other actions include, but are not limited to, one or more of the following: silence music of video player software application when a AR sound is detected, mute AR sound when a loud PE sound is detected, or when PE sound changes suddenly such as an unexpected or uncharacteristic silence, incrementing a timer or resetting a timer that tracks a duration of a sound or lack of sound in order to monitor thresholds of AR sound or PE sound activity, and other actions.

When the wearable electronic device detects physical environment sound and/or electronically generated binaural sound, the wearable electronic device initiates a visual and/or audio alert to the listener wearing the wearable electronic device. The alert can initiate or activate upon detecting the physical environment sound, detecting the electronically generated binaural sound, detecting both, or detecting neither.

FIG. 3 is a method that provides an alert to a listener to enable the listener to distinguish between electronically generated binaural sound and physical environment sound in accordance with an example embodiment.

Block 300 states detect, while a listener wears a wearable electronic device, physical environment sound.

In an example embodiment, one or more sensors monitor and/or detect the physical environment sound. For example, this sound originates from a person or object that is proximate or near the listener while the listener wears the wearable electronic device. For example, the physical environment sound originates from a person or object in a same room of the listener, within an audible range of the listener, or within a range that is detectable by microphones.

Block 310 states determine, based on the detection of the physical environment sound, a location and/or direction of the physical environment sound.

The location and/or direction of the physical environment sound can be calculated from sound waves received at one or more sensors of the wearable electronic device, such as a microphone in or at a left ear of the listener and a microphone in or at the right ear of the listener.

Block 320 states provide, with the wearable electronic device, the visual and/or audio alert to a location based on the detected location and/or direction of the physical environment sound.

The visual and/or audio alert is provided to the listener at the location and/or direction toward the physical environment sound so the listener can visually and/or audibly determine this location and/or direction from the alert (as opposed to determining the location and/or direction from the physical environment sound itself). For example, the earphones or speakers included with a HMD have binaural microphones to monitor PE sound but do not have a pass-thru mode. As another example, in order to concentrate on a VR task the listener has activated an active noise control (ANC) feature and de-activated the pass-thru mode. As another example, even though the listener may hear the physical environment sound, the listener may be preoccupied with sights and/or sounds from the wearable electronic device and thus unable to determine the location and/or direction of the physical environment sound. As another example a passenger wears an HMD while underway in an automobile and has no reason to listen to PE sound inside the automobile or outside the automobile. However, for the sake of safety, the passenger allows the microphones of the HMD to monitor the sound inside and/or outside the auto and to provide a visual or auditory alert for important and/or loud PE sounds. As still another example, a player engrossed in a game executing on a HPED wears CIEMs that provide excellent acoustic isolation such that the player cannot hear PE sound in the frequency range of human speech. An example embodiment executes on the HPED to monitor the PE sound and to display the direction toward PE sound sources that fall within the frequency range of human speech. When human speech PE sound is detected, the example embodiment briefly flashes the display of the HPED and displays an arrow indicating a direction of a speaking person. An increasing number of people wear earphones for long periods in order to occupy an alternative or virtual auditory environment. These many examples emphasize a growing need for solutions that provide protection and improve safety for a society that is increasingly straddling virtual and physical environments. Example embodiments provide a vast improvement in safety for electronic devices and software executing binaural sound.

An example embodiment provides or displays the alert at a coordinate location that corresponds to the coordinate location of the sensed physical environment sound with the microphones. This alert can be provided as electronically generated binaural sound and/or a visual alert.

Consider an example in which the listener wears a HMD while interacting with a VR software application or game (e.g., the listener communicates with an image representing a user in a telephone call or other type of communication). Two microphones at the ears of the listener detect a voice of a person in the environment of the user (the voice being the physical environment sound). This voice occurs at an azimuth direction of forty-five degrees (45°) with respect to the current forward-facing head orientation of the listener. The HMD displays an image representing the talking person in the VR world of the listener at the same or similar location of the actual voice of the person with respect to the listener. Thus, the image representing the talking person appears to the listener at forty-five degrees (45°) azimuth. As such, even though the listener cannot see the person, the listener knows the relative location of the person with respect to the direction that his or her head is pointing.

Sound can also be convolved to localize to match, equal, or correspond to the location of the physical environment sound. In the example above with the HMD, a processor convolves an audible alert with HRTFs having coordinates (r>1.0 m, 45°, 0°). Convolution with these HRTFs places the audible alert at the location of the image that represents the person in the physical environment of the listener.

Consider an example of a hearing-impaired person who dons smart glasses in order to monitor the direction of origin of loud people, audible hazards, or important auditory events in the physical environment that are not visible. An example embodiment alerts the wearer to the presence of and locations of these sound sources in the physical environment with visual alerts corresponding to the direction(s) of the source(s) of the sound. Another type of alert that can be used to notify the listener or wearer is a tactile or vibration alert. The example embodiment also includes tactile feedback that reinforces indication of a presence of and directions toward active PE sound sources in the form a headband included with the smart glasses that looks like a headband of a tennis player. The headband includes an array of vibrating motors around the circumference. The example embodiment actuates one or more vibrating motors corresponding to the direction of the PE sound sources at a speed or effective pressure corresponding to the loudness of each PE sound source. This allows the hearing-impaired wearer to be alerted to the direction of a loud noise coming from 45° azimuth by seeing an image displayed in his or her FOV at 45° azimuth and feeling a vibration along the headband at a matching azimuth (e.g., on the surface of his or her forehead, midway between the median plane and the right ear).

Figure 4:
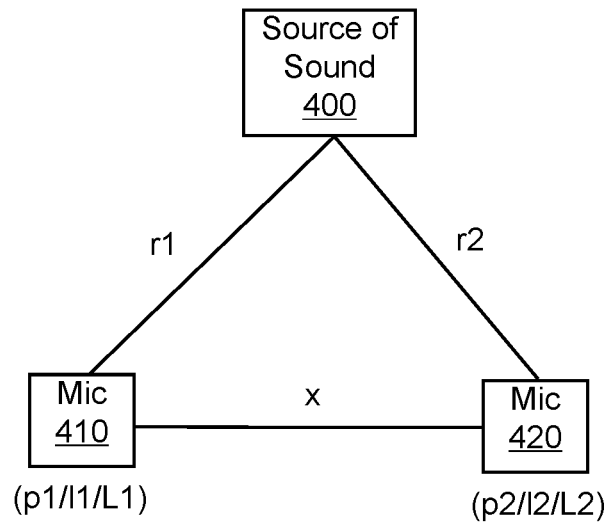
FIG. 4 is a diagram illustrating how to calculate a location and/or direction toward a physical environment sound in accordance with an example embodiment.

FIG. 4 is a diagram illustrating how to calculate a location and/or direction of a physical environment sound in accordance with an example embodiment.

For illustration, a source of sound 400 emits a sound that is received at two spaced microphones 410 and 420. The source of sound (being the physical environment sound) is a distance (r1) from microphone 410 and a distance (r2) from microphone 420. Furthermore, microphone 410 senses a sound pressure (p1) and sound intensity (I1); and microphone 420 senses a sound pressure (p2) and sound intensity (I2).

Sound pressure (p) decreases inversely proportionate to the distance (r) from the measuring point to the source of the sound (i.e., 1/r from the measuring point to the source of the sound). When the distance (r) doubles, the sound pressure measured at the measuring point decreases by one half (½) of the value at the source of the sound.

Sound intensity (I) decreases inversely proportionate to the squared distance from the measuring point to the source of the sound (i.e., $1/r^2$). When the distance (r) doubles, the sound intensity measured at the measuring point decreases by one quarter (¼) of the value at the source of the sound.

Furthermore, sound level (SPL) of a sound wave generally decreases by 6 decibels (dB) at double the distance from the source of the sound.

Sound pressure can be written according to distance as follows:

$$r2 = r1\frac{p1}{p2}$$

Sound intensity can be written according to distance as follows:

$$r2 = r1\sqrt{\frac{I1}{I2}}$$

Furthermore, the sound level (L) in decibels can be calculated at each of the microphones as L1 at microphone 410 and L2 at microphone 420 as follows:

$$L2 = L1 - \left|20\log\left(\frac{r1}{r2}\right)\right|$$

By way of example, two microphones positioned at the ears of the listener measure sound pressure of the incoming physical environment sound. Time difference of arrival (TDOA) can be calculated to determine a direction of the source of the physical environment sound. For example, a cross-correlation function between the two microphones defines a level of correlation between output of the two microphones. For instance, interaural time difference (ITD) is provided as the difference in arrival time of the sound between the two microphones occurs as follows:

$$\Delta t = \frac{x\sin\theta}{c}$$

where $\Delta t$ is the time difference in seconds; x is the distance between the microphones; and $\theta$ is the angle between the baseline of the microphones and the incident sound.

The calculations TDOA or ITD can be compensated for differences in time due to sound travel around or partially around a head of the listener. Furthermore, ITDs can be extracted or obtained from previous measurements, such as stored HRTF data. The measured or recorded ITDs on the listener are compared with stored ITDs from HRTF data to obtain the azimuth angle of the origin of the sound source.

In an example embodiment, the location of the alert being presented to the listener provides directional or locational information. Based on the information of the alert, the listener can discern a direction of the physical environment sound or a location of the physical environment sound while wearing the wearable electronic device. For example, two microphones can determine a direction of a sound source based on different arrival times of the sound at each of the two microphones. For instance, determine the time delay between the arrival of the sound at each microphone and then calculate, using trigonometry, an angle corresponding to the point of origin of the sound. This calculation is possible when the distance between the two microphones is known since the speed of sound is also known. Next, select a HRTF pair having a coordinate location corresponding to the angle calculated for the point of origin of the sound. Alternatively or additionally, display a visual alert on a display with a coordinate location that corresponds to the angle calculated for the point of origin.

Consider an example embodiment that enables a listener to distinguish between electronically generated binaural sounds and physical environment sounds while a wearable electronic device executes a software application, such as a telephone call, VR software application, or AR software application. The listener wears the wearable electronic device that communicates with a user (such as another person or a software program). A processor (such as a processor in the wearable electronic device or a processor in wireless communication with the wearable electronic device) processes or convolves the voice of the user with sound localization information (such as head related transfer functions or HRTFs). For example, convolution of the voice changes the voice from stereo or mono sound to binaural sound. Alternatively, convolution of the voice creates the voice as binaural sound (as opposed to changing the voice from mono or stereo to binaural).

This convolved or processed sound externally localizes as the electronically generated binaural sound to the listener. For example, the voice externally localizes to an AR image, a VR image, a physical object, or a location in empty space (with or without an image). Depending on the SLI selected for convolution, the voice externally localizes at a near-field distance from the listener (e.g., less than one meter from the head of the listener) or at a far-field distance from the listener (e.g., more than three feet or one meter from the head of the listener).

The wearable electronic device or another electronic device provides the voice to the listener. For example, the wearable electronic device wirelessly transmits the convolved voice to wireless earphones or wireless headphones that the listener wears. As another example, the wearable electronic device includes speakers at the left and right ears of the listener that provide the voice to the listener. For instance, such speakers form part of a HMD, electronic glasses, or apparatus that removably houses a smartphone.

The wearable electronic device detects the electronically generated binaural sound or physical environment sound and generates an alert. This alert notifies the listener of the existence, presence, and/or commencement of the electronically generated binaural sound or physical environment sound. Upon hearing and/or seeing the alert, the listener is able to distinguish between the electronically generated binaural sounds and the physical environment sounds. Without such an alert, the listener may not be able to distinguish or discern which sounds are electronically generated binaural sound and which sounds are physical environment sound.

If the alert includes sound, the alert can be provided as one of different types of sound, such as mono sound, stereo sound, or binaural sound. Mono and stereo sound internally localize inside the head of the listener, whereas binaural sound externally localizes outside the head of the listener (e.g., externally localizing to a sound localization point or SLP).

Consider an example embodiment that provides the alert as binaural sound. A processor convolves the sound with the SLI (such as HRTFs) of the listener so the sound externally localizes. The location of this localization can coexist with the location of an image. For example, the listener talks with a user during a telephone call while wearing a head mounted display. The head mounted display displays an image that represents the user, and a processor convolves or processes the voice of the user with the SLI to externally localize at a SLP that matches the location of the image. This processor also convolves the alert with the SLI so the alert also externally localizes at a location that corresponds to the location of the image and the SLP of the voice of the user.

The alert can be part of the voice that the listener hears. Consider an example embodiment that provides the alert as binaural sound. For example, the listener talks with a user during a telephone call while wearing a head mounted display. The head mounted display displays an image that represents the user, and a processor convolves or processes the voice of the user with the SLI to externally localize at the location of the image. This processor adjusts or changes the voice to indicate an alert. The voice continues to externally localize at the image, but the voice is modified. This modification alerts the listener that the wearable electronic device detected a physical environment sound. For instance, this modification includes, but is not limited to, changing or modifying one or more of pitch or frequency of the voice, timbre or tone of the voice, loudness or amplification of the voice, gender of the voice, identity of the voice (e.g., substituting a different voice for the current voice), pausing or stopping the voice, muting the voice, or changing the voice in another audibly perceivable way.

An example embodiment provides a single alert or multiple alerts. For example, the alert is repeated at periodic or regularly-spaced time intervals (e.g., once every second, two seconds, five seconds, ten seconds, fifteen seconds, thirty seconds, minute, two minutes, five minutes, ten minutes, etc.). Alternatively, the alert generates at random time intervals.

Consider an example in which the wearable electronic device includes or is in communication with one or more microphones. For instance, earbuds, earphones, or headphones include a microphone positioned in or at the left and right ears. The microphones detect sound, such as a voice of a person. When the microphones detect a voice, the wearable electronic device generates an alert signal that actuates or triggers the alert to the listener.

Consider an example in which a listener talks to and communicates with a user while wearing a wearable electronic device. The wearable electronic device generates an audio alert and/or visual alert to the listener at one or more of the following times: at a point in time when the user stops talking to the listener, at a point in time when the user pauses talking to the listener, at a point in time when the user starts talking to the listener, while the user talks to the listener, and while the user does not talk to the listener.

Consider an example in which a wearable electronic device includes speakers that are positioned at or in the ears of the listener wearing the wearable electronic device. These speakers produce an audio alert in one of mono sound or stereo sound at a point or points in time while the voice of the user externally localizes to the listener as binaural sound. Alternatively or additionally, the speakers produce an audio alert to the listener as a background sound during the time when the user is talking to the listener (e.g., during a telephone call or verbal communication between the listener and the user). For example, the background sound is music, an environmental sound such as running water, rain, waves, birds, a breeze, an ambience (e.g., a murmur of voices of patrons at a café, distant traffic or machinery), or a room tone (e.g., within a jumbo jet fuselage, a quiet office, a snowy field, an ambience convolved with a particular BRIR or RIR) or a voice of a person instructing the listener of the alert.

Consider an example embodiment that enables a listener to distinguish between a voice of a user that is electronically generated binaural sound and a voice emanating from a person in a physical environment where the listener is located. The listener communicates with a user and wears a wearable electronic device that displays an image that represents the user. For example, this image includes, but is not limited to, one of a real-time picture or photo of the user, a real-time video of the user, a still or moving animated image of the user, a still or moving animated image of someone or something other than the user (e.g., an image of a talking rabbit when the user is a real person), an avatar, a cartoon character, an object that the user selected to represent himself/herself/itself. Further, such images include 2D images, 3D images, AR images, and VR images.

A processor in the wearable electronic device or in communication with the wearable electronic device processes the voice of the user with HRTFs so the voice of the user externally localizes as electronically generated binaural sound to empty space that is at least one meter or three feet away from the listener (e.g., convolving the voice with far-field HRTFs). Left and right speakers (located at the ears of the listener) provide the voice to the listener as the electronically generated binaural sound. One or more microphones (such as microphones located at the ears of the listener in the wearable electronic device) capture a voice of a person near or proximate to the listener while the listener wears the wearable electronic device and communicates with the user. In response to capturing this sound with the microphones, the wearable electronic device generates an audible and/or visual alert to the listener. The alert notifies the listener that the sound he or she is hearing is not electronically generated binaural sound, but physical environment sound.

Consider an example in which the wearable electronic device displays a visual alert that activates while the user is speaking to the listener during the telephone call to enable the listener to distinguish between the voice of the user and the voice emanating from the person in the physical environment where the listener is located. The visual alert remains activated (e.g., remains illuminated) while the microphones continue to detect that the person in the physical environment is speaking. The visual alert deactivates (e.g., turns off) when the microphones stop detecting or fail to detect that the person in the physical environment is speaking.

Consider an example in which the wearable electronic device displays a visual alert as a colored light while the user is speaking to the listener. The light provides the listener with a visual indication when the user is talking. For example, the light includes one of a blue color, a red color, a yellow color, a green color, or another color. Illumination of the light provides the listener with a visual indication that the sound he or she is hearing originates from the physical environment and not from the wearable electronic device. For instance, the light continuously remains on or illuminated or repeatedly flashes while the user speaks.

Consider an example in which the listener wears a wearable electronic device that displays an image of a user while the listener communicates or talks to the user. When another party not involved in the communication (e.g., a person in the physical environment of the listener) talks to the listener, the image of the user flashes or dims in brightness. This visual alert indicates to the listener that a person not participating in the communication is speaking to the listener. Additionally, when the other party not involved in the communication talks to the listener, the voice attributed to the image of the user becomes softer or less loud. Reducing a volume of the voice corresponding to the image of the user enables the listener to better hear the other party and notifies the listener that the other party is talking to the listener.

Consider an example in which the light changes color when the user speaks to the listener. For instance, when the user speaks, the light illuminates green. When the user stops speaking, the light turns off or illuminates red. Alternatively, the light can change brightness or intensity. When the user speaks, the light brightens. When the user stops speaking, the light turns off or dims.

The visual alert can also be a stationary or moving object or virtual object. For example, the object rotates, spins, or moves through 2D or 3D space while being displayed with a wearable electronic device.

Consider an example in which a listener wears a wearable electronic device while communicating with a user (e.g., while the electronic device executes a telephone call, AR software application, or VR software application). During the communication exchange between the listener and user, the wearable electronic device displays an image of the user as an animated, talking person. The wearable electronic device displays a visual alert as a three-dimensional (3D) image that is in a field-of-view of the listener but that is not located at the image that represents the user. When the user speaks, a mouth of the image of the user moves to emulate a speaking person. At the same time, the 3D image rotates while the user speaks to provide a second visual indication that the sound being provided to the listener is electronically generated binaural sound. When the user stops talking, the 3D image stops rotating to visually indicate to the listener that the user is no longer speaking to the listener.

In an alternate embodiment, the visual alert does not activate when the user speaks, but instead activates when the wearable electronic device detects a sound, noise, gesture, or voice from the physical environment where the listener is located.

Consider the example above in which the listener communicates with the user while the listener wears a wearable electronic device. A person in a room with the listener speaks to the listener while the listener talks to the user. Without a visual and/or audio warning, the listener will be confused as to the origin of the voice of the person. Is the person located with the user or did the voice originate at the location of the listener?

In order to solve this problem, the wearable electronic device activates the alert upon detecting the voice of the person in the room with the listener. The wearable electronic device includes a sensor (e.g., a motion sensor, proximity sensor, microphones, etc.) that detects the presence of the person. When the person speaks, the wearable electronic device provides the alert to the listener so the listener can distinguish between a voice originating from the software application and a voice originating from the room in which the listener is located.

Consider an example in which the wearable electronic device includes a sensor (e.g., a camera or motion sensor) that detects gestures of a hand or body of the listener. In response to detecting a hand or body motion of the listener, the wearable electronic device changes a voice of the user from the electronically generated binaural sound to one of stereo sound or mono sound. This function enables the listener to change the voice from being provided as binaural sound to being provided as mono or stereo sound without providing a verbal command. For example, when the listener tilts his or her head in a predetermined direction or sequence, the wearable electronic device changes the voice of the user from the electronically generated binaural sound to one of stereo sound or mono sound or changes the voice from one of mono sound or stereo sound to electronically generated binaural sound.

The visual alert also includes generating and displaying an animated object that represents the source of the sound in the physical environment.

Consider an example in which the listener wears a wearable electronic device while communicating with a user or playing a VR software game. The listener is not able to see his or her physical environment while wearing the wearable electronic device. A person located at the physical environment talks to the listener but the listener cannot discern whether the voice originated from a person in the physical environment or from the VR software game. The wearable electronic device includes a microphone and voice recognition software that detect sound from the person and recognize it as a voice in the room with the listener. In response to this detection, the VR software application generates and displays an animated object to the listener in the VR environment while the user is talking to the listener. When the person stops talking, the animated object disappears from the VR environment. This process enables the listener to quickly and easily discern that the voice being heard was from a person in the physical environment and not from the VR software game.

An example embodiment is thus able to detect (e.g., with a microphone, camera, or other sensor) the presence of a person or sound in a physical environment of a person and provide the listener with an alert. The alert, for example, informs the listener that a voice of a person or other sound is not originating from the VR environment but is originating from the physical environment of the listener. For example, the wearable electronic device detects a voice of a person not in the VR environment but in the physical environment. In response to making this detection, the wearable electronic device activates and displays movement of a 3D image in the VR environment in a field-of-view of the listener to provide a visual indication to the listener that the voice of the person does not emanate from the VR environment but does emanate from the physical environment of the listener.

In order to distinguish between PE sound and AR sound, example embodiments provide the alert as AR sound that moves with respect to a head of the listener (e.g., moving between binaural sound and mono or stereo sounds). For example, after playing a part of the sound that includes audial cues necessary for external localization, the sound becomes stereo sound, and then mixes down to two-channel monophonic sound.

In an example embodiment, an audio alert moves from one SLP internalized by the listener to a second SLP externalized away from the listener along a trajectory. The listener can perceive that the sound moves from his head to the second SLP. For example, an AR sound of a voice of a telephone call plays to a listener at a SLP with coordinates (R, θ, φ). The listener may be confused by a sudden externalized voice, so the voice is played at the internalized SLP briefly, and the listener adjusts to the fact that he is receiving a phone call voice. Then the SLP azimuth and elevation are gradually changed to θ and φ. For example, the electronic system renders the voice to coordinate (0, 0, 0) (e.g., by using, or extrapolating downward from, HRTFs with small values or r such as a near-field pair, or by reducing a two-channel voice to one channel, or by not convolving a voice source), and then fetches another pair of HRTFs with a smallest available r coordinate to continue processing the voice. As the listener continues with the phone call, the distance coordinate r is gradually increased to R, corresponding.

HRTFs are fetched or interpolated for the incrementing values of r, and the SLP is moved along this trajectory from inside the head to outside the head. By the time the distance coordinate reaches R, the listener is able to externalize the voice at the final SLP. The externalized voice is introduced in a comfortable way that does not startle the listener. Playing electronic binaural sound in this manner serves as a method to distinguish AR sound from PE sound.

Another way to distinguish AR sound from PE sound is to provide the listener with both internal localization sound (e.g., stereo or mono sound) and external localization sound or AR sound. Introducing the AR sound with an internalized SLP and then adjusting to an external SLP enables a listener to know that the sound is an AR sound.

After the caller and the listener terminate the telephone call, the listener hears a sound play at an external SLP where he recently heard the voice of the caller. The sound transforms to a mono sound as the distance coordinate of the SLP is gradually reduced from R to values approaching zero. A sound that transforms from an external SLP to an internal SLP is understood to be an AR sound because it is rare to hear PE sounds in this manner.

A telephone call is commonly a known interaction with a party not physically present. Therefore, an example embodiment gradually introduces the SLP into the listener's space and gradually removes it. So the listener experiences a sound starting in his head, emerging from his head to the SLP, and then moving back into his head along a matching path. The listener remains confidently correct that the sound is not PE sound. As an AR sound, it both begins and ends in his head. The moving of the SLP can be accompanied by a fade-in or fade-out of the sound.

An example embodiment provides the listener with trans-dimensional sound to assist the listener in distinguishing between AR sound and PE sound. Trans-dimensional sound can be localized both externally (3D as AR sound) and internally (2D as stereo or mono sound). Such a sound can assure the listener both that the sound did not originate in the listener's physical environment, and that the listener's AR system is capable of delivering localized binaural sound. Additionally, a trans-dimensional sound can be convolved in real-time from a listener-generated sound, ensuring that the sound heard by the listener originates from his electronic system and is not played to him from an outside source. This type of sound also serves to indicate that the electronic system is active.

For example, a listener perceives a two-channel sound change from internalized sound with no external localization to externalized sound with external localization. At the beginning, the sound includes insufficient human audial cues to produce external localization, such as a monophonic sound with both the left and right channels delivering one signal. As the sound continues to play, human audial cues are introduced. The left and right signals diverge and the sound widens to stereo introducing differences in the channels (e.g. panning a sound from the left side of the soundstage to the right side, or a dialogue between characters positioned on opposite sides of the soundstage). The stereo source can widen further and can include a segment where independent left and right sources are unmixed and isolated from each other providing an opportunity for a listener to confirm the operation of both channels. Gradually the sound externalizes into one or more sound localization points (SLPs) of AR sound. The listener hears the AR sound localized in his or her audio space.

A listener can designate a binaural "ringtone" with a transforming sound as an incoming call and/or disconnection alert. For example, Alice allows remote callers to designate a SLP for their voice in her space without informing Alice of the position of the SLP that they select. Alice does not want to be surprised by a localization so she chooses to identify her incoming binaural calls with the binaural sound of a ringing bell. A resulting incoming call alert that Alice hears is an internalized ringing bell transforming to an externalized ringing bell at the SLP designated by the caller. After the call, another similar alert (e.g. a chime played in reverse) transforms from externalizing at the point of the voice of the caller, to a position inside the head of Alice. The perception that an AR sound originates from the position of a listener and ends at the position of the listener can provide a "psychological closure" of the call. In real world conversations, people do not suddenly appear at a location, speak, and then vanish. Instead, people come from somewhere, speak, and exit to somewhere. A listener can find the localization pattern less confusing than seemingly hearing an invisible person or sound at an SLP suddenly play at a proximate location or suddenly become silent without an exit. A comfortable alternative is to render the AR sound at the position of a listener's electronic device, transform the externalization to a target SLP, and then return the SLP to the position of the electronic device. Both examples provide the listener with a predictable location for AR sounds (in the head or at the electronic device), and a way to distinguish the sound as an AR sound and not a PE sound.

Another way to notify a listener is with an audio alert that includes binaural sound at multiple SLPs. For example, each SLP can be a musical note that when played together form a musical chord familiar to the listener. Each note of the chord can represent a particular function of the electronic system and the playing of the note can indicate that a certain electronic system is operating. For example, a listener of the electronic system expecting the familiar chord will know upon hearing the sound of the report if a note is missing. The missing note indicates that a function of the electronic system needs attention.

Trans-dimensional sound can also assist the listener in distinguishing between AR sound and PE sound. For example, a trans-dimensional sound is played upon power-up, login, the donning of earphones, following the initiation of an electronic call such as a binaural call, in the interim prior to call connection, or when an audio alert or report is requested. For example, a trans-dimensional sound can be the alert for an incoming call, such as a telephone call providing electronic binaural sound.

The position and/or movement of the binaural sound through one or more SLPs can communicate further diagnostic or other data to the listener. As an example, consider as an indication that the electronic system has an activated or "powered-up" SLS capable of providing binaural sound: the sound of the artificial sound effect of the swish of air seemingly produced by a first or open hand in a karate film. Such a sound can indicate the operational status of both an AR system and a gesture sensing system by producing the swish sound localized to the gesturing hand of a listener. For example, a listener wishes to check, test, or confirm that his audio augmented reality (AAR) system or SLS is activated, or that one or more SLPs are currently able to produce sound. The listener queries the operational status by performing a rapid arm movement. A swish sound from a SLP near his arm indicates to the listener that he is able to perceive non-PE sound at this time.

The listener indicates to the electronic system that he wishes to confirm the system's readiness and/or state of activation of the SLS, for example by performing a gesture, or with a voice command. In response to the indication, the system plays a prearranged sound that begins with a lower degree of perceivable localization and ends with a higher degree of perceivable localization. For example, the system first provides the sound in mono, then switches the sound to stereo, then switches the sound to binaural sound at a predetermined SLP away from the listener. If the listener perceives the end of the prearranged sound at one or more SLPs then he or she knows that the SLS is currently active.

If the listener perceives the end of the prearranged sound without localization, (internalized within his head, at no particular SLP, or does not perceive the prearranged sound at all), he or she can suspect a problem with the SLS or other part of the electronic system.

In an example embodiment, a listener can request the system to provide a report so the listener can determine whether the audio portion of the electronic system is properly functioning. The listener can request the report in unconventional ways.

For example, the listener produces a humming sound (i.e., a wordless tone produced with the mouth opened or closed) to request a report from the system. A hum such as a hum of an approximate prearranged frequency can be a sufficiently unique sound, independent of language, that can be identified by the listener's electronic system and rarely produce a false positive request for a report. A listener can produce a hum sound without opening the mouth, at a low volume, and a hum is more discreet than a vocal command since a hum does not cause proximate people to falsely believe the listener is speaking. The request from the listener may also be in the form of a discreet natural movement. One appropriate gesture is a head tilt. The head tilt, head turn, or head cock is a common reflex gesture performed by humans when attempting to more closely discern the distance of a sound source directly ahead, behind, overhead, or below. A tilt gesture can be readily detected by the head orientation determiner 1177 discussed herein (e.g., using gyroscopic sensors in the earphones or other sensors).

An example embodiment allows a listener to designate a single SLP in question. By touching or activating the SLP he can distinguish that the localization is not PE sound.

A listener can designate a SLP by "touching" the SLP. A sensor or electronic device in the listener's environment is able to know the position of his hand with respect to an SLP. When the listener's hand coincides with the location of the SLP (in the experience of the listener "touching" the location or the sound), this event can cause the SLP to indicate to the listener whether it is a PE sound or AR sound. If the SLP is known by the electronic system to be coincident with a nearby object, the electronic system is afforded additional ways of knowing that the SLP is being touched, such as visual confirmation of a hand at the location of the object using a camera in communication with the system.

Consider an example in which Alice hears a mosquito at a certain coordinate (r, θ, φ), and she does not know if a mosquito is in her room or if her AR system is localizing the sound of the mosquito. Alice reaches out toward the sound. When her hand intersects with the location (r, θ, φ) to touch the mosquito, the sound is adjusted to a fuzzy or scratchy or static mosquito sound, as if her hand has corrupted the mosquito sound. The unnaturally modified sound indicates to Alice that the sound is an AR sound, not a real sound, and therefore a mosquito is not in her room.

Consider another example in which Alice receives a doll as a gift and places it on her desk. She hears singing coming from the doll and she does not know if it is a singing doll or if the sound of singing is augmenting the sound she hears externalized at the location of the doll. She touches the doll. Upon touching or nearly touching the doll she hears her own prerecorded voice say, "it's an illusion." As other examples, she hears the click of a wine glass at the position of the doll, or she hears the sound of singing internalized during moments when her hand is at the doll. These example audible reports confirm for Alice that the doll cannot sing.

The head tilt gesture can also select a single SLP to query or adjust. The electronic system can interpret the direction of the head tilt, nod, cock, or gaze as the direction toward the target SLP. Further, the system can trigger the selected SLP to, for example, indicate to the listener that the SLP represents an AR sound.

An example embodiment can inform the listener that a selected sound is AR sound by switching the sound to an internalized sound for the duration of the selection. For example, the listener designates a certain sound to be internalized for a brief duration (e.g., he or she selects or clicks a location of a localization while wearing a HMD). The listener can naturally infer that a failure of his or her command to internalize the sound indicates that the sound is PE sound originating in the room. The listener knows that, consistent with PE sound, the sound does not internalize. This method of distinguishing a sound allows the listener to continue listening to the sound without interruption of the content of the sound.

Other methods that can indicate that the sound originates from an AR SLP are to mute, unmute, pause or resume the playing of an audio stream, or other action. The event of touching or dragging a SLP can also cause it to be rendered on a visual display, or rendered differently on a visual display. These indications can aid in moving the SLP and also aid in distinguishing an AR SLP from a PE sound. For example, while wearing a WED or smart glasses that include earphones, Alice hears a doll singing and nods toward the doll. A gesture sensor in her wearable electronic device detects that the nearest SLP in the direction she nodded is an SLP at the doll playing a singing sound. In response to the nod gesture, the electronic system pauses the singing sound. Alternatively, rather than a nod gesture, Alice cocks or tilts her head 15° to the side while looking at the doll as though she is wondering about the doll. In fact, she is wondering about the doll and the gesture suits the use of the gesture. A gesture sensor registers the infrequent but discreet tilt and triggers a gaze detector to sample Alice's gaze vector. The gaze vector is found to pass through the coordinates at the SLP of the doll and Alice hears the doll laugh at its position, and then words, "Oh don't stare . . . " from matching polar coordinates but from half the distance coordinate. Then Alice hears, " . . . It's just me . . . " spoken near her left ear, and then the word, "Dolly!" whispered at a location inside her head. This relaxes Alice because the trans-dimensional audio report reveals to Alice the true nature of the silent inanimate doll as one that does not produce PE sound.

One or more of a set of SLPs can be commanded to play sound in order to establish that a certain location relative to the listener can produce AR sound. In situations when a listener has an electronic device without a visual display, a software application can execute to cause SLPs (or subsets of SLPs such as active, inactive, silent, selected, recently created, owned, not owned, SLPs that played sound less than a certain number of minutes in the past, SLPs with a distance coordinate not greater than a certain r, etc.) to audibly enumerate. For example, each SLP can "count off" one after another in turn, automatically, or one-by-one with each audible enumeration triggered by the listener confirming a next step. The execution of the enumeration can be triggered by events such as triggered by a listener or other user with a gesture or key press or other command. A listener can command a next step forward in the enumeration, or a step backward in the enumeration. The sound played in the enumeration can be one sample sound, adjusted to convolve at each SLP, so the listener can hear how the sample sound differs at each SLP. The enumerations sound can be a different sound played at each SLP such as ordered consecutive numbers (e.g. "SLP one," "SLP two," "SLP 3"). Each SLP may be labeled or relabeled. The enumeration sound played to identify each SLP can be a verbal recitation of the label of the SLP. Additionally, the enumerations can be played at one point in time or one after another in turn. If an electronic device of the listener has head-tracking or gaze tracking hardware and software, a software application can be instructed to cause a chime to play at each SLP that is included within the bounds of a listener's gaze. In this way, a listener can pan and scan an environment to listen for otherwise recently silent and undetected SLPs. SLPs can be selected and caused to make a continuous or repeating sound in a similar way to a beacon until deselected or canceled or for a period of time. Playing a selection of many SLPs can help a listener identify unknown SLPs.

In order to distinguish AR sound from PE sound, the electronic system can execute together with images on a visual display. For example, the display can highlight the location of each active or silent SLP, and this visual indication shows the listener that sound localizations not corresponding to a PE source of sound. For example, consider a listener amidst a number of SLPs, some corresponding to physical objects in the room, some in space with no visual correspondence, some stationary and some in motion. A listener may be unable to distinguish or recall SLP locations when the SLP is not providing sound. A listener can execute an application on a handheld portable electronic device (HPED) or other electronic device in communication with a camera and display screen in order to display or expose the SLPs within the field of view of the camera lens. For example, a software application can overlay images representing SLPs in the environment of the listener. These images are displayed in perspective according to each SLP's position relative to physical objects, walls, ceilings, etc. The display screen can function as a window to enable a listener to view SLPs or visualize SLP coordinates that otherwise are invisible. The HPED can be waved and panned across an environment to search for otherwise silent and undetectable SLPs. Alternatively the listener can see the SLPs rendered as images while wearing a HMD or OHMD.

A SLP not explicitly designated to be visible can be visually rendered temporarily while it has focus, or is selected, or while it is being moved. The SLP can disappear from the display after being moved or unselected.

A listener can determine AR sound from PE sound in other ways as well. For example, AR sound can be presented in a distinct way from PE sound. Alternatively, PE sound can be emphasized in contrast to AR sound. For example, AR sound can be highlighted or distinguished by default if a listener is roaming in public, sleeping, driving, if AR sound is rarely played, etc. Whereas, PE sound can be highlighted or accented by default if a listener is aware of the convention, such as an immersive game player who remains in VR for hours. The PE sound that disturbs him can be highlighted, rather than highlighting the game sound for hours.

Sound can be "watermarked" as a method of highlighting the sound to assist a listener in distinguishing sound. A listener can designate the electronic system to include with each AR sound a "watermark" such as one or more of unique recognizable audio tweaks such as a particular pitch, frequency, timbre, reverberation, word pace, syllabic tempo, play rate, resonance, color, spectral profile, or other qualities of a sound and their combinations. Another type of watermark may be imprinted on, convolved with, or played together with the AR sound such as a background sound.

Background sound can be played during AR sound. For example, a background sound can be a white noise sound that a listener can ignore, but that is distinct in its absence. Consider an example background sound of distant crashing waves or breeze that is included when an AR sound is played, so that a listener can distinguish the AR sound from PE sound by the sound of distant crashing waves.

A background sound can be played during the playing of an AR sound and also during AR silence, and can be muted when a PE sound is played. This method solves two additional problems by providing the listener with two additional pieces of information. The background sound emphasizes that sound perceived without background sound is PE sound. The contrast of the background sound ceasing provides the listener with an audial cue in order to distinguish that the sound played at the moment when the background sound is muted is a PE sound. So PE sound is positively distinguished. The background sound informs the listener that the AR system is active and that the listener is not blind to AR sound (AR blind). In other words, the listener gets confirmation that he or she is able to hear AR sound should AR sound be designated to play.

Alternatively, a background sound can be played during PE sounds, or, during PE sound and PE silence but muted during AR sound. One example PE background sound is a "room tone" with few distinct impulses responses (IRs) but carrying the IR color of a space. As a specific example, consider as a PE background sound the amplified sound captured by mic-thru. This example background sound assures the listener that the PE system is operating and that the listener is not PE blind (i.e., the listener is able to hear PE sound should it occur). A sudden PE sound or impulse can be detected and the volume reduced prior to playing through the earphones so that that a default safe amplification of the PE sound can be restored.

Alternatively, one background sound can be played during PE sound, and another background sound can be played during AR sound. For example, an electronic system assigns the white noise sound of distant rain to PE background sound because it is raining, and a white noise background sound of wind to AR sound.

A family of one type of background sound can be played during PE sound, and another set of related background sounds can be played for AR sound. Consider an example in which one tone is played during periods of AR silence and when an AR sound is louder than an PE sound, and another tone is played during periods of PE silence, and when PE sound is louder than a concurrent AR sound. In this example, both tones are played during periods when both AR and PE systems are active but quiet. Consider further that the two different tones when played together cause a distinct sound so that the absence of one is detected by a listener, and this allows the listener to passively monitor the active states of the PE and AR systems. In other words, if the listener does not hear the distinctive dual-tone sound during a period of quietness then he is made aware that the AR system or PE system is not functioning.

Consider an example in which one tone is the anti-phase wave of the other tone, so that when played together the listener hears no tone due to destructive interference, but when one tone is missing the listener hears a tone. Alternatively, one tone plays during PE sound, and the anti-phase tone plays during AR sound. The resulting effect is that the tones are heard when an PE sound is playing and a AR sound is not playing, or vice-versa, but the tones are not heard if both an PE and AR sound is playing. These and other background sound schemes both help a listener to distinguish PE sound from AR sound, and/or to alert a listener to a condition of PE blindness and/or AR blindness.

A listener may instruct the system to provide AR sounds with one or more audial "tags" such as fade-ins and/or fade-outs, a tick or tone appended and/or prepended to each AR sound or sound phrase. The tags can also occur intermittently or at regular intervals.

Consider an example in which a listener wears earphones that enable the listener to hear both electronic binaural sound from the earphones and PE sounds as naturally occurring sound that passes through the earphones. The listener would be unable to distinguish the natural sounds from electronically generated binaural sounds. The earphones, however, provide a "ping" sound as an alert sound at an external SLP or in an external localization zone before the electronic binaural sound localizes to the SLP or zone. When the listener hears the ping, he or she knows that the next sound will be an electronic binaural sound. The ping thus provides the listener with an audio warning or audio notice that the sound is an electronic binaural sound.

The alert sound can be selected and presented in a way that helps to prevent the listener from being startled. For example, instead of playing a ping, the electronic system plays a soft muffled sound that can alert the listener without a sudden impulse that may surprise the listener. Two different listener-preferred sounds can introduce an AR sound or PE sound respectively. For example, following a period of no mic-thru signal in the earphones, the electronic system enters an idle mode and stops playing sound to a listener. Later, a sudden sound in the listener's space occurs when his sister speaks to him. The speech of the sister is captured in real-time from the listener's mics but stored in memory and delayed by three seconds. A soft alert sound plays to the listener at a low volume that increases gradually such as over a duration of three seconds. The soft alert sound is followed by the voice of the sister and the listener is not startled. The duration of the phrase of the sister's speech is six seconds, but due to the three-second gentle "wake-up" sound, the listener hears the first syllable of the speech three seconds later than it was spoken. The electronic system plays the six seconds of speech at a quicker artificial rate (e.g., without changing the pitch) that compresses the six seconds of speech into four seconds. The listener is not startled, and he is able to distinguish the sound as PE sound. He is able to respond to the voice with a delay of +1 second. As the conversation continues, the PE system is no longer in an idle state and the listener hears the rest of the speech in real-time.

Consider further this example of the listener wearing earphones. The listener does not like to hear the "ping" sound and prefers to hear another sound instead. The listener selects a different sound from his sound listener preferences, and this newly selected sound plays as the alert or notice that the sound is an electronic binaural sound.

The alert sound indicates that an electronic binaural sound can occur before the electronic binaural sound plays or while the electronic binaural sound plays. For example, if electronic binaural sound plays for an extended period of time, the listener may forget that the sound playing is actually electronic binaural sound. The system can set the warning or notice sound to play at predetermined intervals (such as 30 seconds, one minute, two minute, five minute intervals, etc.). A listener can establish these intervals. A computer program (e.g., an intelligent user agent or IUA) or a manufacturer can set these intervals.

Zones can also distinguish PE sound from AR sound. In one example embodiment, a listener is apprised of a sound being an electronic binaural sound based on where the sound externally localizes with respect to the listener.

Certain sounds are assigned to certain zones or certain SLPs. A sound appearing in one zone or a certain SLP indicates to the listener that the sound is actually an electronic binaural sound. For example, a listener designates a zone above his head for certain AR sounds, such as incoming voice messages. When the listener localizes the voice of a voice message above his head, he knows that the voice does not come from a person in the room above his head.

A listener can distinguish PE sound from AR sound according to the volume or loudness of the sound. For example, a default, maximum, minimum, average or rolling average volume delivered by the mic-thru system can be decreased so the listener experiences a quieter environment, or the amplification can be increased (e.g. the general function of a hearing aid for the hearing impaired). A listener, IUA, or other software program can adjust a ratio or mix of mic-thru signals to AR signals at 50:50, 0:100, 100:0, or a ratio in between such as 80:20. A listener, IUA, or other software program can also adjust amplification independently for mic-thru and AR signals. For example, a listener adjusts AR volume to a maximum loudness of "2" as marked on the loudness adjustment interface. Thereafter the listener can identify sound he perceives at a loudness greater than "2" as PE sound. The PE:AR sound mix can be inverted or toggled. For example, a listener sets PE:AR loudness at 1:9 while he plays a game. When he hears his mother calling from downstairs in his house (at a low volume), he triggers the mix to invert to 9:1 so he can hear his mother's voice louder. He still hears the sounds in the game at a lower volume. Toggling the ratio allows a listener to quickly change auditory focus between AR sound and PE sound.

A loudness inversion or other change in sound can be triggered in many ways. Some examples include but are not limited to: a listener "double-click's" his teeth in a closed mouth and the sound or impulse is detected by a sensor such as the listener's mics, a listener clenches his jaw, contracting a muscle causing a bulge or motion near the ear to be detected by a sensor at the earphones, a listener wiggles his ears and a motion from the contraction of the auricular superior and/or auricular posterior is detected by a sensor at the earphones, a gesture, a manual switch on the HPED.

The electronic system can determine to invert or adjust the volumes and trigger the change without direction from the listener. For example, a sudden loud PE noise can be shielded from the listener and reduced in volume or an urgent AR alert can be played louder. A binaural cue can trigger a change in volume such as the detection that a listener is giving attention to a particular PE sound. For example, a listener playing a computer game has a PE:AR ratio set at 20:80. His mother approaches him in his room but the volume of her voice is low (as dictated by the ratio selected by the listener), so the listener turns to face his mother. Because the listener adjusted PE sound to a lower relative volume, the lower volume of his mother's voice assists the listener in distinguishing the voice as a PE sound. As the listener faces his mother who is standing at 0° azimuth, the electronic system detects that the left and right signals have a matching ITD and ILD. The electronic system determines that the listener is giving attention to the PE sound because the PE sound is at or near 0° azimuth. In accordance with this determination, the electronic system increases the PE volume and/or reduces the AR volume, such as by toggling the inversion of the ratio or PE:AR balance.

Figure 5:
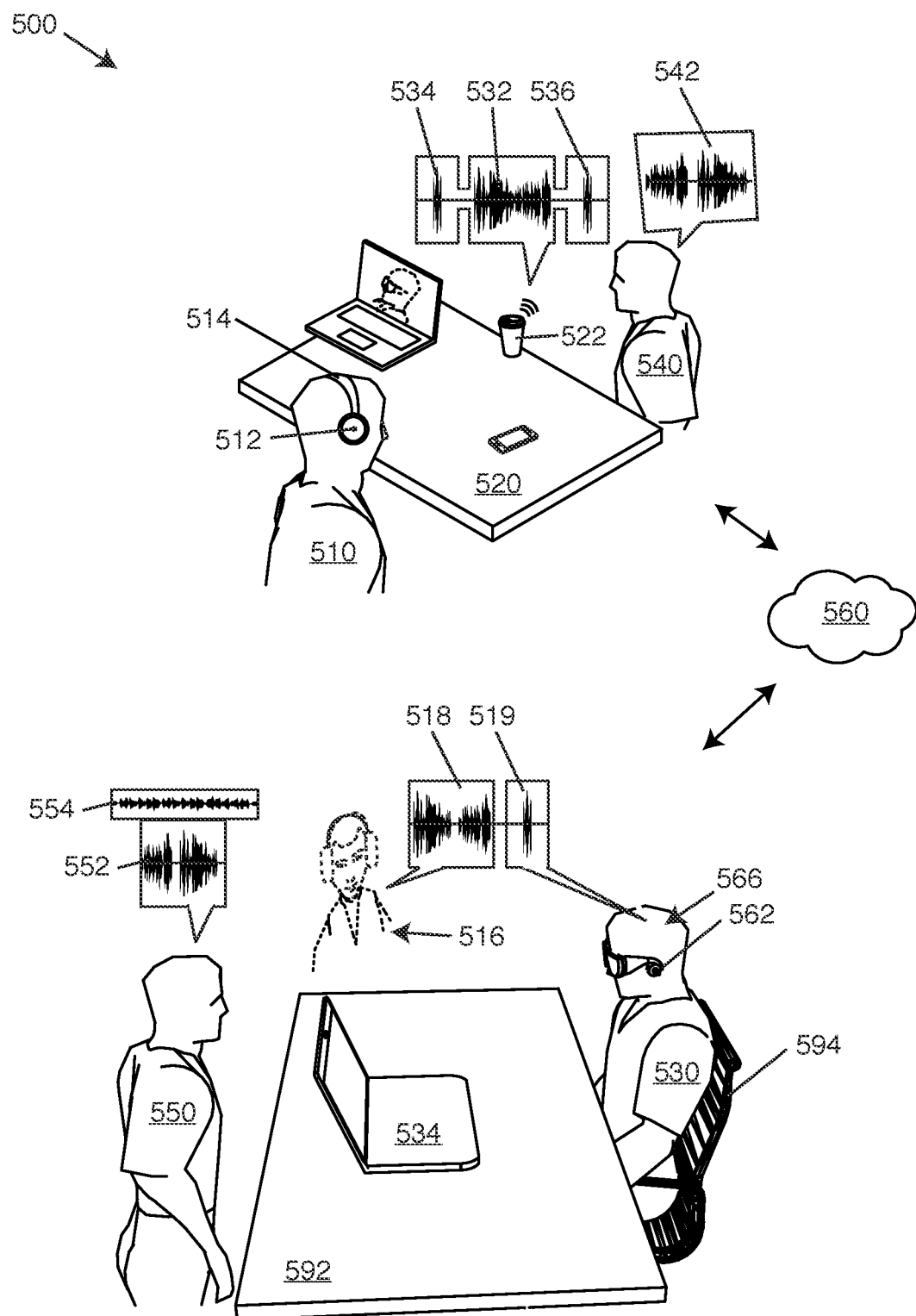
FIG. 5 shows an electronic system that provides a listener with an alert to distinguish between physical environment sound and electronic binaural sound in accordance with an example embodiment.

FIG. 5 shows an electronic system 500 that provides a listener 510 with an alert to distinguish between physical environment sound and electronic binaural sound.

The listener 510 is at a first geographic location, sits at a desk 520, and speaks with a proximate person 540 in the room. The listener 510 also speaks with another person 530 in a remote location over one or more networks 560. The listener 510 hears the voice 542 (drawn as an example waveform within a "speech balloon" coming out of the head of the proximate person) of the proximate person 540 from the location of the head of the person 540 as the person 540 speaks.

Microphones 512 included in a wearable electronic device 514 worn by the listener 510 capture the voice of the proximate person 540 and the voice of the listener 510. The voice 542 passes through the microphones 512 and wearable electronic device 514 to the ears of the listener 510.

One or more processors process and/or convolve a voice 532 of the remote person 530 so this voice is provided to the listener 510 as electronic binaural sound that externally localizes. The voice can localize to the listener to empty space or at a physical object. By way of example, the listener 510 hears the voice 532 of the remote person 530 as binaural sound localized to the position of a cup 522 on the desk 520. Sound does not emanate from the cup 522, but the sound of the voice 532 of the remote person 530 is convolved by a processor in the electronic system 500 such that the listener 510 localizes the voice 532 at the position of the cup 522. Hence the listener 510 is shown as localizing two voices in the room. A voice 542 of the proximate person 540 is sound being generated in the physical environment shared by the listener and the proximate person. Another voice 532 (drawn as an example waveform within a "speech balloon" coming out of the cup 522) is electronically generated binaural sound delivered via a network 560 and not emanating from a person in the room.

Listener 510 localizes the two voices in front of him or her from similar locations. That is the SLP of voice 542 and the SLP of voice 532 appear close to each other from the point of view of the listener 510. However, the listener 510 can distinguish the electronically generated binaural sound of the voice 532 from the voice 542 occurring in the room due to one or more audio alerts 534 and 536 (drawn as example impulse waveforms) played along with the convolved voice 532.

An example embodiment convolves audio alert 534, a short impulse or tone, to the SLP of the voice 532 prior to playing the voice 532 of the remote person 530. This improves the experience of the listener 510 by providing a warning or alert to the listener 510 regarding the SLP of the incoming voice 532. Alternatively an example embodiment plays audio alert 536 following, during, instead of, or in addition to playing the prepended audio alert 534.

Consider this example wherein the speech 532 is a sentence or a phrase of speech of the remote person 530, and the audio alert 536 is appended to the phrase, following the phrase, as shown. For example, when the remote person 530 stops talking momentarily, the example embodiment convolves the audio alert 536 with a same HRTF pair executed to localize the speech to the cup 522. Alternatively, the audio alert is processed to localize another way (e.g., at a zone designated for audio alerts, inside the head of the listener, or in accordance with another example embodiment discussed herein). An example embodiment plays an audio alert that beeps in mono sound to the listener following each phrase of speech that the listener localizes externally.

Consider this example wherein the time between audio alert 534 and audio alert 536 is a set duration such as five seconds, ten seconds, thirty seconds, a minute, etc.

This improves the experience of the listener 510 by preventing the listener from attributing the words or sounds of the remote person 530 to the proximate person 540, and vice-versa.

Remote person 530 sitting in a chair 594 at a desk 592 with a laptop computer 534 wears an OHMD 562 providing augmented reality images and sound so that remote person 530 sees an image or avatar 516 and hears convolved speech 518 of listener 510 as though proximate to the desk 592.

An example embodiment plays an audio alert 519 each time there is a pause or lull in the inbound voice from listener 510. The voice 518 from listener 510 (indicated for ease of illustration as a speech bubble that emanates from image location 516) is convolved to a SLP coincident or near to AR image 516. The audio alert appended to the speech 518 is not convolved to the external location 516 and is instead processed to localize internally to remote person 530 at SLP 566.

The AR image 516 is shown as a dashed outline in the FIG. 5 in order to distinguish the AR image from physically present people 550 and 530 shown with unbroken or non-dashed lines. Although the drawing illustrates the AR image with dashed lines, the AR image or avatar may appear to the wearer of the OHMD 532 with a high degree of realism or indistinguishable from a human being that is physically present such as person 550. This example embodiment improves the understanding of person 530 because the person 530 hears frequent audio alerts during the conversation with listener 510 that serve to both inform and intermittently remind person 530 that the AR image 516 is an image and not a real person.

Remote person 530 also speaks with the person 550 who is present in the environment together with person 530. An example embodiment captures the speech 552 of person 550 with microphones included with OHMD 562. This speech can be provided to the person 530 as pass-thru speech or speech that is not altered. Alternatively, the OHMD 562 can alter the speech or add to the speech in accordance with an example embodiment. When this speech passes-thru, the person 530 localizes the speech 552 at the location of the head of person 550.

Consider another example wherein the speech 552 (which is physical environment sound) is processed or altered with the OHMD. For example, a background sound 554 is added to, mixed with, convolved with, or played together with the speech 552. This background sound is a lower volume than the speech, has a constant nonintrusive waveform, starts before the speech 552, and continues after a phrase or after a pause of the speech 552. Consider a similar example wherein an audio alert that is a background sound is played to distinguish the speech of remote speakers alternatively to distinguishing speakers or sound sources that are physically present.

FIGS. 6A-6H show an electronic system with fields-of-view of a listener 610 wearing a WED or OHMD during a telephone call or other communication with a user.

Figure 6A:
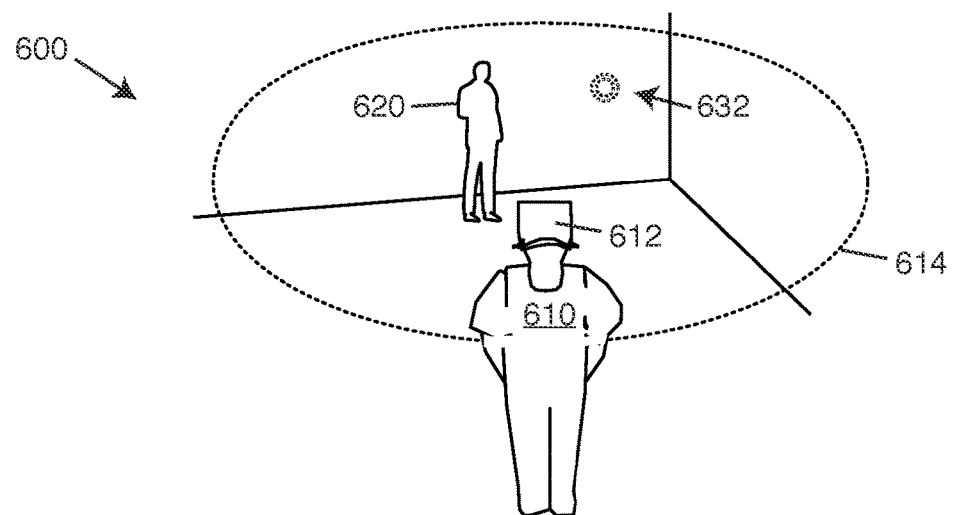
FIGS. 6A-6H show an electronic system with fields-of-view of a listener wearing a WED or OHMD during a telephone call or other communication with a user in accordance with an example embodiment.

FIG. 6A is a third-person point-of-view of the listener 610 facing a person 620 together in a room 600. The listener 610 is engaged in a phone call executing on the OHMD 612 worn by the listener. For example, an OHMD is a wearable display such as electronic glasses or another wearable electronic device having the capability of reflecting projected images and providing them as AR. For example, the OHMD projects an AR image of a caller or user and allows the listener to see the physical environment including proximate people in a room. The OHMD permits the listener to see and hear things in the physical environment, such as the person 620 in the room 600. The OHMD is also capable of modifying or augmenting images in a field-of-view 614 of the listener (the field-of-view 614 is shown as a dashed-lined ellipse). The OHMD also includes headphones or speakers that deliver binaural sound and permit the listener 610 to externally localize sound to positions in the room 600. For example, a voice of a caller externally localizes to a sound localization point 632.

FIGS. 6B-6H show the field-of-view that the listener sees through the OHMD at various times, including things in the physical room 600, such as person 620 and images augmenting the field-of-view, such as an image 630C of a caller. Some FIGS. 6B-6H also include illustrations indicating sounds such as speech.

Figure 6B:
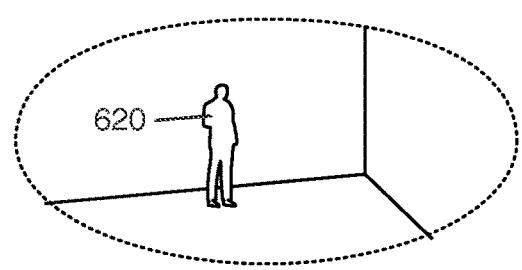
Figure 6C:
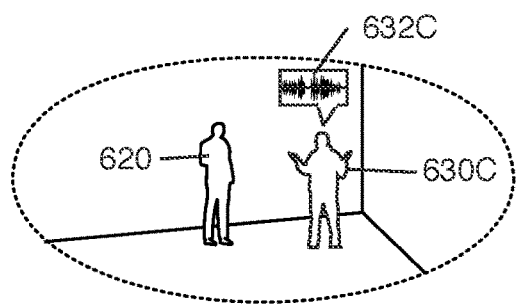
Figure 6D:
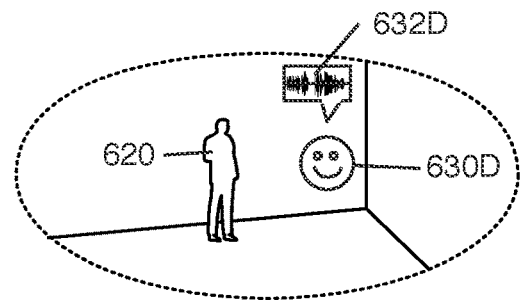
Figure 6E:
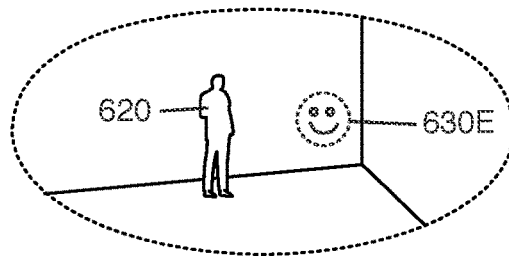

The caller is not physically present in the room. As such, a caller is not visible in the room 600 and not shown in FIG. 6A because FIG. 6A is a third-person point-of-view of the room and not an illustration of a view as seen by the listener 610. FIGS. 6B-6H, however, illustrate what the listener 610 sees in his field-of-view while wearing the OHMD 612. In the field-of-view (FOV) of FIG. 6C the listener does see an image 630C of a caller in the room and also sees the person 620 in the room. In FIG. 6C the OHMD 612 augments the FOV as seen by the listener 610 to include the image of the caller 630C in the room.

Consider an example embodiment in which an image of a caller does not appear to the listener 610 except during the time that a caller is speaking or sending sound. For example, listener 610 engages in a telephone call with a caller and while a person 620 is in the room 600. Before the caller speaks, the listener 610 sees a field-of-view such as shown in FIG. 6B in which an image representing the caller does not appear. In FIG. 6B OHMD 612 is not displaying an image of a caller. When the caller does speak or emit a sound 632C (for the sake of illustration the sound is shown in the figure as a waveform in a "speech bubble" but the sound or speech is not visible in this example), then the OHMD 612 includes an image 630C of the caller. As the caller continues to speak, the listener continues to see the image 630C of the caller.

When the caller terminates the call, stops speaking, or pauses speaking, an example embodiment stops or pauses displaying the image 630C of the caller. This results in the listener seeing the FOV of FIG. 6B. The display of the image 630C of the caller alternates between being shown and not shown in accordance with the caller speaking or not speaking respectively. The listener 610 sees his FOV alternating between FIGS. 6B and 6C accordingly, as the caller stops and starts speaking.

Consider an example in which the image 630D of a caller presented by the OHMD 612 to augment the FOV of the listener 610 is not a 3D image but instead a 2D image 630D, such as a smiling circle. The 2D image is rendered such that the listener can localize the position of the 2D image in the 3D environment (e.g., with visual cues such as shadows, reflections, and scaling) when the caller sends voice or a sound 632D.

Consider an example in which an image 630E representing a caller does not disappear when the caller is not speaking, but instead changes in appearance, such as by changing a color or brightness. For example, an OHMD presents to a listener the FOV of FIG. 6D in which the listener sees image 630D representing the caller while hearing the voice of the caller 632D. When the caller stops talking, the listener sees the FOV of FIG. 6E in which the image 630E representing the caller persists being displayed but is changed in appearance, such as having a dashed outline, a lower brightness, or a different color. If and when the caller speaks again, the image representing the caller on the display is updated (e.g., to a solid line, a greater brightness, a different color) to indicate to the listener 610 that the voice localizing at or near the image 630D is an AR voice and not the voice of person 620 or other physically present person.

An example embodiment uses colored lights to distinguish electronic binaural sound from sound originating in the physical environment for the listener. Consider an example where a blue light, LED, image, background, or highlight is activated to indicate that a sound is being played that is not originating in the physical environment of a listener.

Figure 6F:
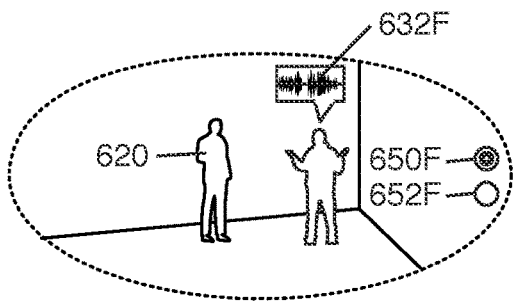
Figure 6G:
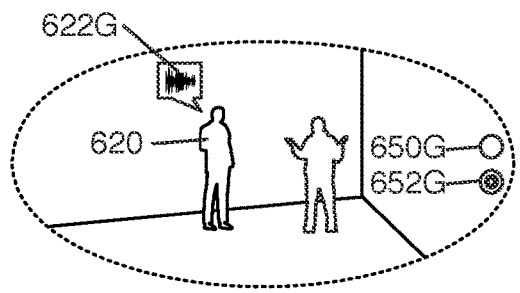

FIGS. 6F and 6G show FOVs at times in which a remote caller is speaking and a proximate person 620 is speaking, respectively. An example embodiment includes a blue visual alert 650F shown in FIG. 6F to be activated, indicating that electronically generated binaural sound (in this case sound 632F) is being played. The FOV also includes a green visual alert 652F that is not activated. FIG. 6G shows the FOV with deactivated blue alert 650G indicating that a binaural voice (e.g., sound 632F) is not actively playing. The activation of a green alert 652G indicates that the caller is presently listening or that a microphone or virtual microphone is monitoring the caller and/or the listener 610. Alternatively, the activation of alert 652G is triggered when microphones included in the OHMD 612 detect voice or other sound in the physical environment in order to indicate that the physically proximate person 620 is presently speaking (e.g., the voice 622G that the listener is localizing to its point of origin at the head of the person 620). Consider an alternative example wherein the colored lights that indicate an origination of sound represent eyes, face, or body of a caller, image of a caller, or avatar.

Figure 6H:
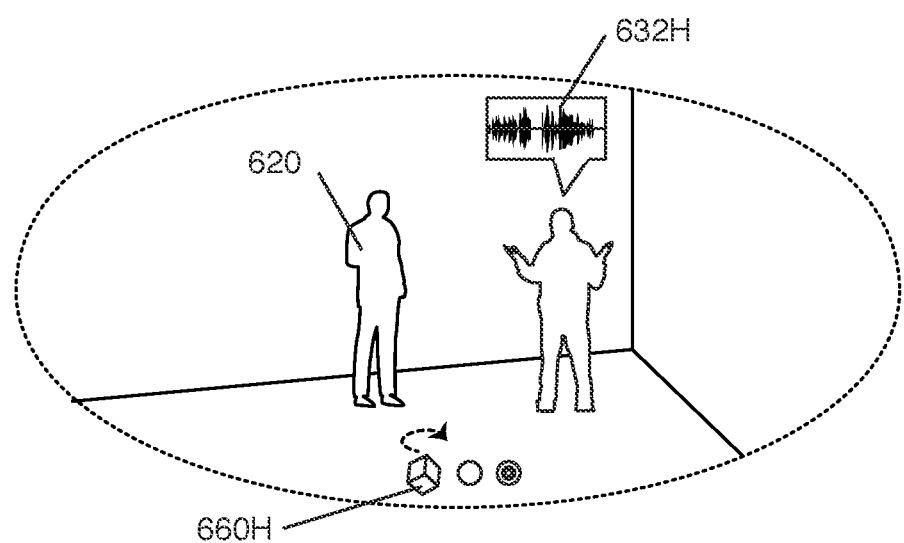

FIG. 6H shows another FOV seen by the listener 610 in which an image or icon exhibits some animation in order to indicate to the listener that AR sound is being played (in this case the AR sound is the voice of the caller 632H). For example, a 2D image pulses, a wireframe image changes position, or looping sequence of images appear to the listener as moving, rotating, hopping, color-shifting, throbbing, or otherwise animating. 660H is an animation of a cube spinning in place and indicates that, while spinning, electronically generated binaural sound is being played to the listener. A dashed arrow indicates the direction of rotation of the cube icon. The direction is changeable. Also, the type of animation is changeable. For example, a colored light or LED can animate smoothly in gradations or in steps from blue to green to blue. When the caller stops or pauses speaking, the animation 660H continues, or stops, or slows, or changes. For example, the cube appears to spin for the duration of the telephone call including during the time when the caller is not speaking. When the caller is not speaking the cube spins more slowly or changes color. At the termination of the telephone call the cube stops spinning.

FIGS. 7A-7J show an electronic system with fields-of-view of a listener wearing a WED or HMD during a telephone call or other communication with a user. The size, shape, resolution, and type of field-of-view (FOV) provided by a HMD vary. An example FOV is shown is a dashed-lined ellipse 714.

The HMD includes headphones or speakers that deliver electronic binaural sound and permit the listener to externally localize sound to positions proximate to him or her, such as a location of a voice of a caller originating from a location that is one meter or more away from a head of the listener. The HMD also has microphones at the ears of the listener that can capture sound from the physical environment and present this PE sound to the listener in a pass-through mode, with variable amplification, or with some modification of the sound captured from the physical environment. FIGS. 7A-7J show the FOV that the listener sees via the HMD at various times. To aid in discussion, some figures also include illustrations indicating sounds such as speech.

Consider an example embodiment in which an image of a caller does not appear to the listener except during the time that a caller is speaking or at a time when an electronic device of the caller is sending sound. FIGS. 7A and 7B show two FOVs of the listener engaged in a VR telephone call with callers Alice (being shown as 720A-720J) and Bob (being shown as 730A-730J). Before Alice and Bob speak, the listener sees the FOV of FIG. 7A in which the images representing Alice 720A and Bob 730A are in a state of lower visibility such as faint, transparent, translucent, low resolution, or invisible. The lower visibility state is indicated as dashed outlines of the images that represent the callers 720A and 730A. When Bob speaks his voice 732B is convolved to the location of his image at 730B. The voice 732B may be illustrated on the display of the HMD in the FOV to the listener to inform the listener that Bob is speaking (e.g., as a waveform and/or text such as in a "speech bubble"). For ease of illustration, the speech is shown as waveforms in some figures.

When Bob speaks the image of Bob changes to become visible, more visible, highlighted, or accented such as by changing a level of transparency or translucency, changing a color, or changing in another way. The more visible state is indicated in FIG. 7B as a continuous outline. As Bob continues to speak, the listener continues to see the image or avatar of Bob 730B. When Bob stops or pauses speaking then the image representing Bob returns to the less visible, less highlighted, or less accented state represented in the FOV of FIG. 7A as image 730A.

FIG. 7C shows a FOV with both callers speaking and so the images representing Alice 720C and Bob 730C are therefore being visually represented with a higher visibility. The listener sees the FOV of FIG. 7D at a moment in which Alice is speaking so the image representing Alice 720D is more visible or highlighted than the image representing Bob 730D who is not speaking. The increased visibility of the image representing a current speaker improves the experience of the listener by informing the listener whom or which character or caller is being heard.

The FOVs of FIGS. 7E and 7F show respectively a moment when Bob is speaking, and then pauses speaking. In this example, the image representing Bob 730E is an icon, 2D image, or other image that may include or not include a likeness of Bob. It is not necessary for an image representing a caller to be a 3D model or 3D image. A 3D image or a flat image can be displayed so as to visually localize in the 3D VR space of the listener by using shading, shadows, scaling, and other visual rendering techniques. When Bob stops speaking and the listener no longer hears the voice of Bob 732E, an example embodiment adjusts the image representing Bob from an image that is more visible 730E to an image that is less visible 730F, not highlighted, or not visible. Alice does not start or stop speaking during the times shown in FIGS. 7E-7F, so images representing Alice 720E-720F are not triggered to change with respect to visibility.

An example embodiment uses colored lights to distinguish a caller that is speaking, or a voice or sound that is convolved to localize in the VR environment or a voice or sound that is captured from the physical room of the listener. Consider an example where a blue light, LED, image, background, or highlight is activated to indicate that a sound is being played that is not originating in the physical environment of a listener. FIGS. 7G and 7H show FOVs that distinguish active voices. An example embodiment includes an activated blue visual alert 750G at the head of an image representing Bob 730G, distinguishing Bob as the speaker of the voice 732G.

FIG. 7H shows the FOV with deactivated blue alert 752H that is illustrated as an ellipse under the image representing Bob 730H indicating that a voice of Bob is not actively playing. The activated alert 750H around the feet of the image representing Alice 720H indicates that Alice is presently speaking (e.g., the voice 722H is localizing at 720H). Alternatively, the activated alert 750H indicates that.

Alice is presently listening or that a microphone or virtual microphone is monitoring Alice and/or the listener. The ellipses or other shapes can appear to be shadows, spotlight beams, or glowing floor tiles. The ellipses or other shapes surround or highlight the image that represents the caller, on the floor or ground beneath the image, or behind the image.

Figure 7I:
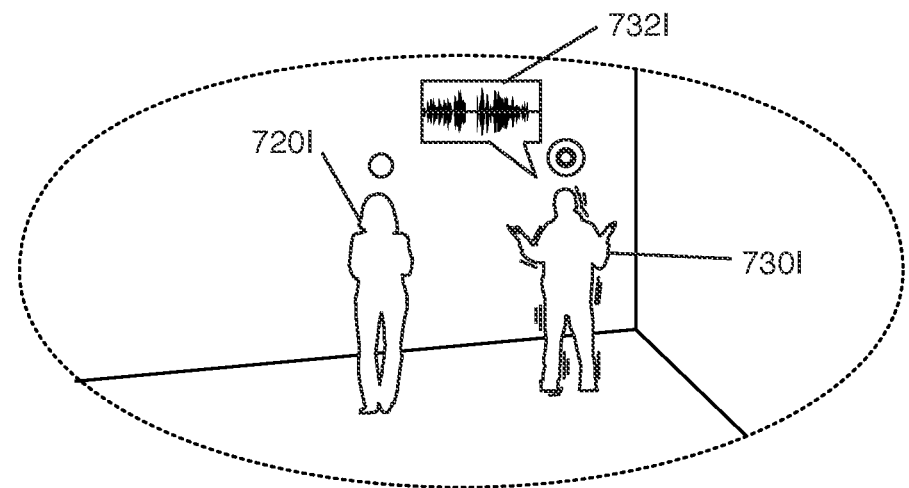

FIG. 7I shows another FOV of the listener in which an image or icon exhibits animation in order to indicate to the listener which caller is speaking. For example, the image of Bob 730I is seen in the FOV to vibrate (as indicated in FIG. 7I with vibration lines). The animation of the image 730I indicates that, while vibrating or animating, the electronically generated binaural sound 732I is being localized to the listener at approximately the location of the animated image 730I.

FIG. 7I also shows lights, LEDs, or highlights as spheres over the heads of the images representing Alice 720I and Bob 730I. These spheres rendered at or over the images representing Alice and Bob can be any assigned different colors and the significance of the color and the activation and position of the lights or highlights are changeable.

Figure 7J:
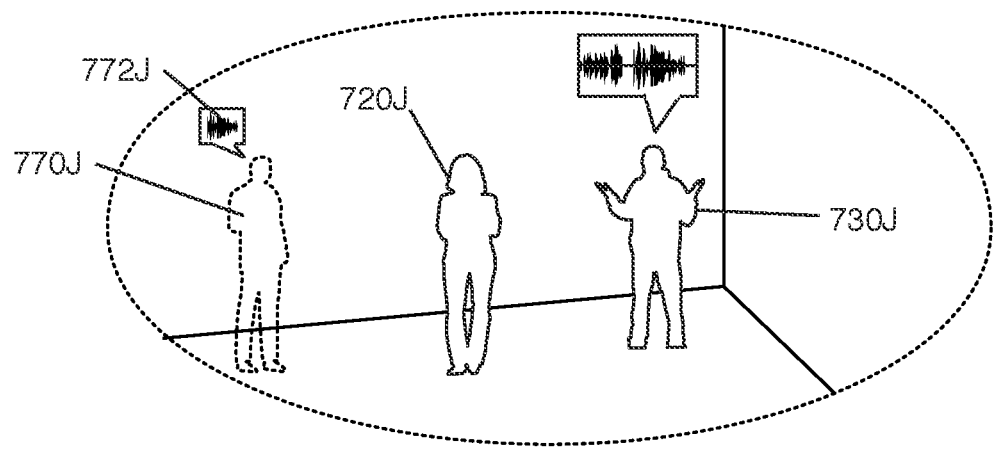

FIG. 7J is a FOV with a voice of Chuck 772J indicated to localize from an image of Chuck 770J. The listener sees an image of Alice 720J who is not speaking and an image of Bob 730J who is speaking. The listener does not see the physical environment of the room that he or she occupies. A person Chuck enters the physical room occupied by the listener and speaks. Microphones of an HMD at the ears of the listener capture binaurally the sound of the voice of Chuck 772J. An example embodiment calculates an interaural time difference (ITD) of the sound of the captured voice of Chuck. Upon determining the ITD the embodiment further determines an azimuth angle relative to the facing direction of the listener and corresponding to the ITD and renders an image of a person 770J at the azimuth angle. In this example, a reduced visibility shown as a transparent dashed-outlined figure indicates to the listener that the person speaking the sound 772J is physically proximate to the listener who is wearing the HMD, and indicates an approximate direction toward the person.

One problem with wearing headphones that capture and amplify physical environment sound from the physical environment as well as supply electronic binaural sound is that a listener may need to quickly switch or alternate between focusing on the sound from the physical environment delivered by the headphones, to focusing on other sound delivered by the device or headphones (e.g., electronic binaural sound, music, phone calls).

One or more example embodiments solve this problem and provide a quick and convenient way for a listener to change between listening to electronic binaural sound and listening to physical environment sound.

Figure 8:
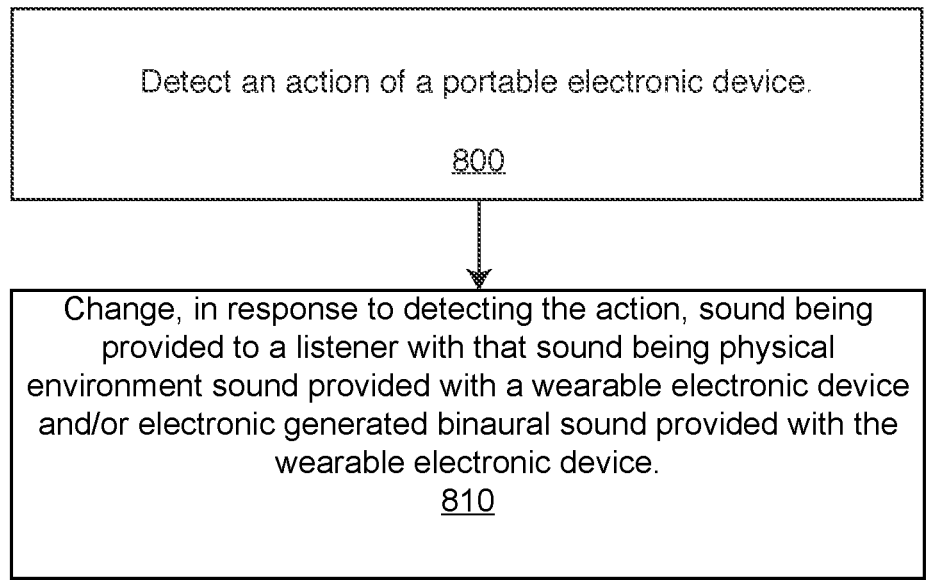
FIG. 8 is a method that detects an action of a portable electronic device and changes sound in response to detection of the action in accordance with an example embodiment.

FIG. 8 is a method that detects an action of a portable electronic device and changes sound in response to detection of the action.

Block 800 states detect an action of a portable electronic device.

The actions include, but are not limited to, one or more of rotating the portable electronic device, moving of the portable electronic device (e.g., shaking the portable electronic device or moving it through the air in a predetermined way), gripping or holding the portable electronic device (e.g., grabbing the portable electronic device with a hand), activity of a person (e.g., sensing when the person is walking or running or sitting), releasing the portable electronic device (e.g., releasing the portable electronic device from a hand), covering a sensor of the portable electronic device (e.g., covering or darkening a lens of a camera), detecting a face of a person (e.g., detecting with facial recognition software the presence or proximity of a person), detecting absences of a face of a person (e.g., detecting with facial recognition software an absence of a face of a person), detecting or sensing light, detecting or sensing darkness, detecting or sensing presence of a person or hand (e.g., with a sensor), detecting or sensing an identity or biometric of a person (e.g., detecting a fingerprint or thumbprint of the person, identifying a person by iris image, retina scan, ear form, or another biometric), detecting a change in an electrical power source of a PED (e.g., changing between battery-supplied power and another source of power), detecting a change in audio output configuring of a PED (e.g., changing from between sound being output from speaker and sound being output from headphones, detecting the an event of headphones being plugged-in or unplugged, coupled to the PED or decoupled, powered on or off), or another action discussed herein.

By way of example, one or more sensors in the portable electronic device detects when the action occurs. For instance, these sensors include, but are not limited to, a camera, a gyroscope, an accelerometer, a magnetometer, a compass, an optical or capacitive scanner, a display, a proximity sensor, a light sensor, a pedometer, a fingerprint sensor, or another sensor.

Block 810 states change, in response to detecting the action, sound being provided to a listener with that sound being physical environment sound and/or electronic generated binaural sound provided with the wearable electronic device.

The portable electronic device changes or switches sound being provided to the listener in response to detecting the action. Consider an example in which a three-axes accelerometer and/or gyroscope in the portable electronic device senses rotation of the portable electronic device. In response to detecting the rotation, the portable electronic device takes an action with regard to the sound. These actions include changing a volume or loudness of AR sound relative to PE sound, changing a characteristic of the PE sound or AR sound, changing or switching AR sound or PE sound (1) from being binaural sound to being mono sound or stereo sound or (2) from being mono sound or stereo sound to being binaural sound, toggling the output of the headphones between AR sound and PE sound. Other actions include, but are not limited to, muting the sound, lowering the volume, raising the volume, stopping the sound, ending or terminating a telephone call, placing a telephone call on hold, joining another call, joining another virtual auditory space, muting or pausing or changing a particular sound type or input source, or performing another action.

In an example embodiment, toggling or switching between providing AR sound at a higher volume or loudness than PE sound, and providing PE sound at a higher volume or loudness than AR sound occurs when the portable electronic device (e.g., a WED with or in communication with headphones or earphones) detects a gesture of the listener.

Consider an example in which smart earphones include sensors, such as an inertial motion unit (IMU) with an accelerometer, magnetometer, and gyroscope. The IMU senses or detects an amount and/or speed of rotation of the earphones as worn by the listener. When the amount of rotation and/or speed of rotation of the head reaches a predetermined threshold, the smart earphones execute one or more of the actions (e.g., reduces the volume of the AR sound and/or increases the amplification of the PE sound).

For example, a listener is playing PE sound louder than AR sound in order to monitor the surroundings. When the listener cocks his or her head (e.g., 20° roll of the head toward the left shoulder), the example embodiment makes the AR sound louder than the PE sound. Tilting of the head of the listener thus provides a convenient way to change between focusing on sound of AR or VR or music, and sound occurring in the room. Example embodiments are not limited to the threshold value or amount of twenty degrees (20°) since other threshold values or amounts can be designated to trigger a change between PE sound and AR sound.

Consider an example in which proximity sensors on left and right earphones detect the presence or position of a hand. A hand gesture that covers a left or right side of an earphone triggers a muting of the AR sound, while a hand gesture covering the contralateral earphone triggers a muting of the PE sound. As another example, a hand gesture that touches or covers a left (or right) earphone triggers a reduction of the amplification of the PE sound that is being captured and/or increases the volume of the other sound being delivered by the earphones. A gesture that is a cupping of the hand behind the left (or right) earphone triggers an increase in the amplification of the PE sound and/or a lowering of the volume or loudness of the AR sound. This improves the experience of the listener since a gesture of covering one's ear is a common action to lessen environmental noise, and a gesture of cupping a hand behind a pinnae is a common or useful gesture when a listener desires to amplify or focus on the sound coming from a particular direction in the environment.

Consider an example in which the action of changing relative sound volumes of AR sound and PE sound occurs when the electronic device detects a change in orientation of the electronic device such as with respect to a face and/or head of the user. When the change reaches or exceeds a threshold value, then execute the change. The change in orientation can occur in one of several ways. First, the orientation of the head and/or body of the user changes with respect to the electronic device while the electronic device does not move. For instance, a user rotates his head or moves with respect to a stationary camera, facing sensor (e.g., front-facing sensor, rear-facing sensor), or other sensor. Second, the orientation of the electronic device changes with respect to the user while the user does not move. For instance, a user holds a smartphone in his or her hand while the camera captures an image of the face and executes facial recognition and distance determination. The user rotates the smartphone so the camera no longer captures the face of the user. Third, both the user and the electronic device move to change the orientation of the user with respect to the electronic device. For instance, the user holds the smartphone in his hand and simultaneously rotates his head and the hand holding the smartphone.

Consider an example in which the action of changing relative volumes of the binaural sounds is triggered when a WED detects rotation of a particular rotational or angular speed of the WED. For example, a listener wears an OHMD and rotates his or her head slowly and no change is triggered. When the listener rotates the head quickly, a change is triggered. The change is triggered when the rotation occurs within a predetermined time or crosses another threshold, such as a predetermined number of revolutions per second or radians per second. By way of example, a change in the sound is triggered when a quarter rotation or ninety degrees of rotation occurs within a range of 0.1 seconds-0.5 seconds. Consider an example in which a listener wearing smart glasses with earphones is in a telephone call and has adjusted the volume of the voices of the phone call to be louder than the voices of other people in the room where the listener sits. The listener is approached by someone in the room who needs help, so the listener rotates his head to trigger the PE sound to be louder than the phone call and AR sounds. After attending to the person, the listener rotates the head again to toggle the AR sound as the primary sound with the higher volume.

Consider an example in which a listener holds a smartphone in front of his face while talking to a friend. The listener hears the voice of the friend as binaural sound that localizes to an image on the display of the smartphone. To switch the voice from being provided in binaural sound that externally localizes to the smartphone to being provided in mono or stereo sound that localizes inside a head of the listener, the listener performs one of the actions discussed herein. As one example, the smartphone gives priority to PE sound when a camera in the smartphone ceases or fails to detect a face of the listener. For instance, prioritize AR sound only while the camera detects the face of the listener. Change to prioritizing PE sound when the camera no longer detects the face of the listener. As another example, the smartphone toggles the prioritization of AR:PE sound when the camera or another sensor detects darkness. For instance, give priority or weight to PE sound if the camera or sensor does not detect a certain level of light. Change the focus to AR sound when the camera is activated (e.g., the listener places the smartphone on the table, exposing the display or camera; the listener removes the smartphone from a pocket or purse, etc.).

Consider an example in which an electronic device captures an image of a person with a camera. The electronic device executes a software application to detect a face and perform facial recognition. During the period of time that the camera detects the face of the person, the electronic device reduces the volume of sound captured at the ears of the person. When the camera no longer detects the face of the person, then the electronic device performs an action (such as toggling the relative volumes of the AR and PE sound from/to 80:20 to/from 20:80).

Facial detection and/or facial recognition enables a person to toggle quickly back and forth between concentrating on manufactured binaural sound and paying attention to the events nearby. For example, during a telephone call or while playing a software game, a listener holds a HPED (e.g., holds a smartphone in his or her hand) or wears a WED (e.g., wears an electronic watch). A camera in the HPED or WED monitors the face of the listener. When the listener desires to change toggle the sound, the listener rotates the HPED or WED so the camera ceases to capture or detect the face of the listener, or capture something different. When the listener desires to change back to the prior sound balance, the listener rotates the HPED or WED so that the camera captures or detects the face of the listener, or captures something new.

Instead of or in addition to rotating the HPED or WED, an example embodiment allows the listener to make the mic-thru sound louder or less loud compared to the VR phone call sound by moving his or her head. A camera in the HPED or WED monitors the face of the listener. The HPED or WED changes the sound when the HPED or WED detects a change in head orientation or a change in gaze of the listener (e.g., the listener looks away from the camera or display or rotates his or her head by a predetermined amount). For instance, the electronic device changes from accentuating local sounds to accentuating VR voices or vice-versa when one of the following occurs: the listener stops gazing or looking at the display, the listener turns his or her head away from the display, the camera no longer detects the face of the listener, the camera detects a "full face" view, a side profile, a "three-quarter" view, or another view between a "full face" view and a profile of a face of the listener, the camera detects a top of the head of the listener, and the camera detects that the eyes of the listener are closed for a predetermined amount of time.

Consider an example in which a listener talks to another person during a telephone call while holding a smartphone or other HPED. The listener hears the voice of the other person as binaural sound that localizes at the HPED. The HPED changes the relative energy levels of the AR sound vs. the PE sound upon detecting an action from the user, such as detecting an incoming phone call, detecting a non-vocal mouth or body sound impulse (e.g., impulse from clapping, impulse from biting or clicking the upper and lower teeth together), detecting a manual volume adjustment, detecting a hand gesture, detecting a facial gesture or head gesture, detecting a voice command or vocal energy change (e.g., a shout) or a vocal frequency (e.g., a hum of a certain note), or detecting another action. Detection of one of these actions enables the listener to change quickly between focusing on auditory events that are happening around his or her body and voices, music or other sound that is inbound from another location or virtual environment.

Changing an AR or PE loudness or relative volume can also occur in response to detecting or sensing a change in distance of a listener from an object, such as the electronic device. For example, a camera or facing sensor in a HPED tracks an image or orientation of a person or face of a person during a video call. The person hears the voice of the other person during the video call in binaural sound and also hears the PE sound of the room. When the person moves a predetermined distance from the HPED display the HPED automatically increases the volume of the voice so that the listener can focus on the content of the spoken words without the benefit of seeing the accompanying video of the caller that includes additional informational cues such as facial expression, head and hand gestures, and lip movements. For instance, change the relative sound volumes when the person moves more than one meter away from a present position or from the HPED, more than 1.5 meters away, more than 2.0 meters away, etc. A camera or sensor captures an image or orientation of the head of the person, and the distance of the person or head from the HPED is determined based on a size of the face and/or body image captured or sensed with the camera or sensor.

One way to distinguish between electronically generated binaural sound and physical environment sound is to provide the sound to the listener in different formats, such as mono sound, stereo sound, and binaural sound. When the listener hears sound in two or more of these formats, the listener becomes aware that an audio alert is being provided. The alert notifies the listener that the sound the listener is hearing or will hear is electronically generated binaural sound or physical environment sound.

The audio alert can be a separate sound from the sound being provided to the listener, such as a separate beep, tone, noise, or other sound to alert the listener. Alternatively, the audio alert can actually be the sound itself without a separate sound as the audio alert. For example, the sound being provided to the listener is convolved or processed into two or more formats of mono sound, stereo sound, and binaural sound. Natural or physical environment sound does not appear to listeners with such format changes so the listener becomes aware that the sound he or she is hearing is electronic binaural sound.

For example, consider an incoming voice from a caller to a listener Alice that is twelve seconds long and that says, "Hello Alice, my voice begins as though in your head but as I continue, my voice moves away from you until you eventually hear my voice way out to here, two meters away." An example embodiment processes and plays the sound as one continuous twelve second sound, but having five sections as follows:

Section 1-0:00 seconds to 0:02 seconds—play as monophonic sound.

Section 2-0:02 seconds to 0:04 seconds—play as stereo sound, left-panned.

Section 3-0:04 seconds to 0:06 seconds—play as stereo sound, right-panned.

Section 4-0:06 seconds to 0:09 seconds—play as binaural sound convolved to a distance on one meter.

Section 5-0:09 seconds to 0:12 seconds—play as binaural sound convolved to a distance of two meters.

As a result of the processing, Alice hears the twelve-second sentence as the voice of the caller. The first few words she hears localize internally as mono sound; she hears the next few words toward the left, the next few words toward the right. As the playing of the twelve-second voice continues, she soon externalizes the voice of the caller. If the vocal greeting began as suddenly localizing to two meters, Alice may be startled, as well as unsure of the origin of the voice. By processing the beginning of voice telecommunication in this way, an example embodiment allows a listener to begin receiving the voice of an incoming caller without first selecting a SLP and with an assurance that the voice does not come from a proximate person. This improves the experience of the listener by allowing an incoming caller to select a SLP without startling the listener, and saving time while establishing the call since the listener does not need to allow incoming binaural sound calls on a case-by-case basis.

Consider an example where the twelve-second incoming voice is processed per the five sections above, and also includes smooth transitions between the sections. For example, between section 1 and section 2, the stereo width begins with a narrow separation. Between section 2 and section 3, the stereo pan slides gradually from the left, through a center balance, to the right, between section 4 and section 5 the voice is convolved to 1.3 m, then 1.6. Between section 3 and section 4, individual characteristics of the sounds or waveform samples are interpolated.

Figure 9:
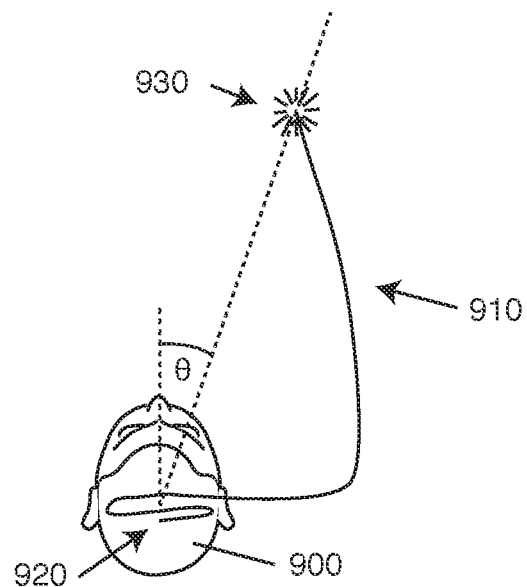
FIG. 9 shows a method that enables a listener to distinguish between electronically generated binaural sound and physical environment sound in accordance with an example embodiment.

FIG. 9 shows a method that enables a listener 900 to distinguish between electronically generated binaural sound and physical environment sound in accordance with an example embodiment.

The sound being provided to the listener 900 switches or changes formats of mono sound, stereo sound, and binaural sound; and this switching or changing signifies to the listener that the sound is electronic binaural sound and not physical environment sound.

Switching or changing of the sound is shown along a line 910 that signifies where the listener localizes the sound. Initially, the sound starts as mono sound and localizes inside the head 920 of the listener. The sound then changes to stereo sound and localizes inside the head 920 of the listener. This change between mono sound and stereo sound is shown with the curved or S-shaped line 910 inside the head of the listener 900.

Line 910 proceeds to exit a right ear of the listener 900 and stops at a final sound localization point (SLP) 930. This line illustrates the sound changing from stereo sound (which is localized internally) to binaural sound or binaural audio (which is localized externally). The listener will hear the sound inside the head and then outside his or her right ear and moving away from his or her head along the line 910 until the sound stops moving to the SLP 930. Movement of the sound signifies or alerts the listener that the sound he or she is hearing is actually electronic binaural sound and not physical environment sound.

Consider an example of the listener talking to a user while the listener wears an OHMD. When the user first speaks to the listener, the listener would not be able to distinguish whether the voice of the user is originating from a VR application executing with the OHMD or from a person physically located near the listener. Voices from both sources sound identical to the listener, and both voices externally localize as binaural sound. In order to assist the listener in distinguishing between these two sources of sound, the OHMD switches or changes the format of the voice of the user. For example, the voice of the user starts as mono sound, then changes to stereo sound, then changes to binaural sound. Natural human voice cannot perform such changes. So, the listener knows that the voice of the user is electronic binaural sound from the VR application of the OHMD.

Figure 10:
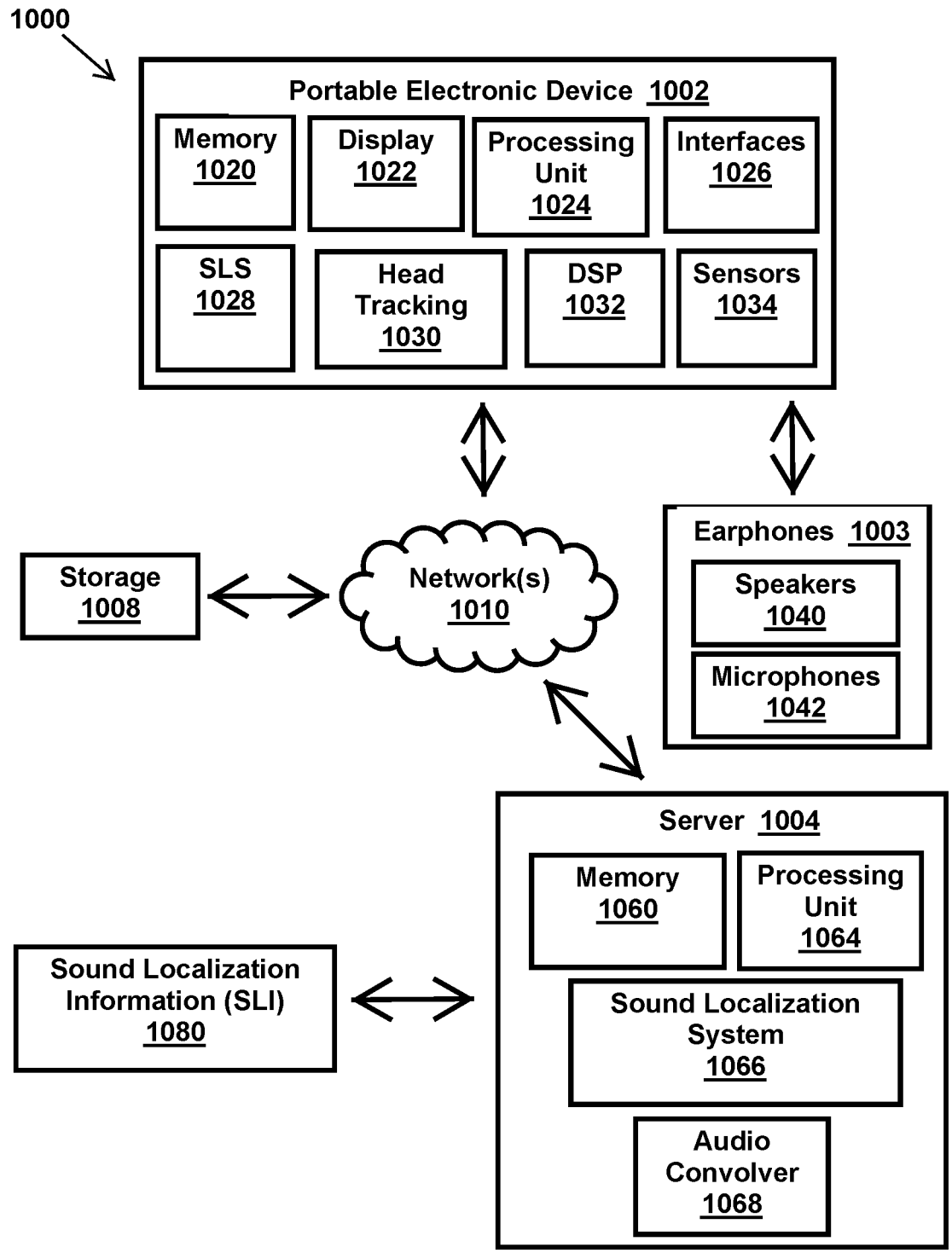
FIG. 10 is a computer system or electronic system in accordance with an example embodiment.

FIG. 10 is a computer system or electronic system 1000 in accordance with an example embodiment. The computer system includes one or more of a portable electronic device or PED 1002, one or more computers or electronic devices (such as one or more servers) 1004, and storage or memory 1008 in communication over one or more networks 1010.

The portable electronic device 1002 includes one or more components of computer readable medium (CRM) or memory 1020 (such as cache memory and memory storing instructions to execute one or more example embodiments), a display 1022, a processing unit 1024 (such as one or more processors, microprocessors, and/or microcontrollers), one or more interfaces 1026 (such as a network interface, a graphical user interface, a natural language user interface, a natural user interface, a phone control interface, a reality user interface, a kinetic user interface, a touchless user interface, an augmented reality user interface, and/or an interface that combines reality and virtuality), a sound localization system (SLS) 1028, head tracking 1030, a digital signal processor (DSP) 1032, and one or more sensors 1034 (such as a camera, proximity sensor, or other sensor discussed herein).

The PED 1002 communicates with wired or wireless headphones or earphones 1003 that include speakers 1040 and/or other electronics (such as microphones 1042).

The storage 1008 includes one or more of memory or databases that store one or more of audio files, sound information, sound localization information, audio input, SLPs and/or zones, software applications, user profiles and/or user preferences (such as user preferences for SLP locations and sound localization preferences), impulse responses and transfer functions (such as HRTFs, HRIRs, BRIRs, and RIRs), and other information discussed herein.

The network 1010 includes one or more of a cellular network, a public switch telephone network, the Internet, a local area network (LAN), a wide area network (WAN), a metropolitan area network (MAN), a personal area network (PAN), home area network (HAM), and other public and/or private networks. Additionally, the electronic devices need not communicate with each other through a network. As one example, electronic devices couple together via one or more wires, such as a direct wired-connection. As another example, electronic devices communicate directly through a wireless protocol, such as Bluetooth, near field communication (NFC), or other wireless communication protocol.

Electronic device 1004 (shown by way of example as a server) includes one or more components of computer readable medium (CRM) or memory 1060 (including cache memory), a processing unit 1064 (such as one or more processors, microprocessors, and/or microcontrollers), a sound localization system 1066, and an audio or sound convolver 1068.

The electronic device 1004 communicates with the PED 1002 and with storage or memory that stores sound localization information (SLI) 1080, such as transfer functions and/or impulse responses (e.g., HRTFs, HRIRs, BRIRs, etc. for multiple users) and other information discussed herein. Alternatively or additionally, the transfer functions and/or impulse responses and other SLI are stored in memory 1020 or another location, such as storage 1008.

Figure 11:
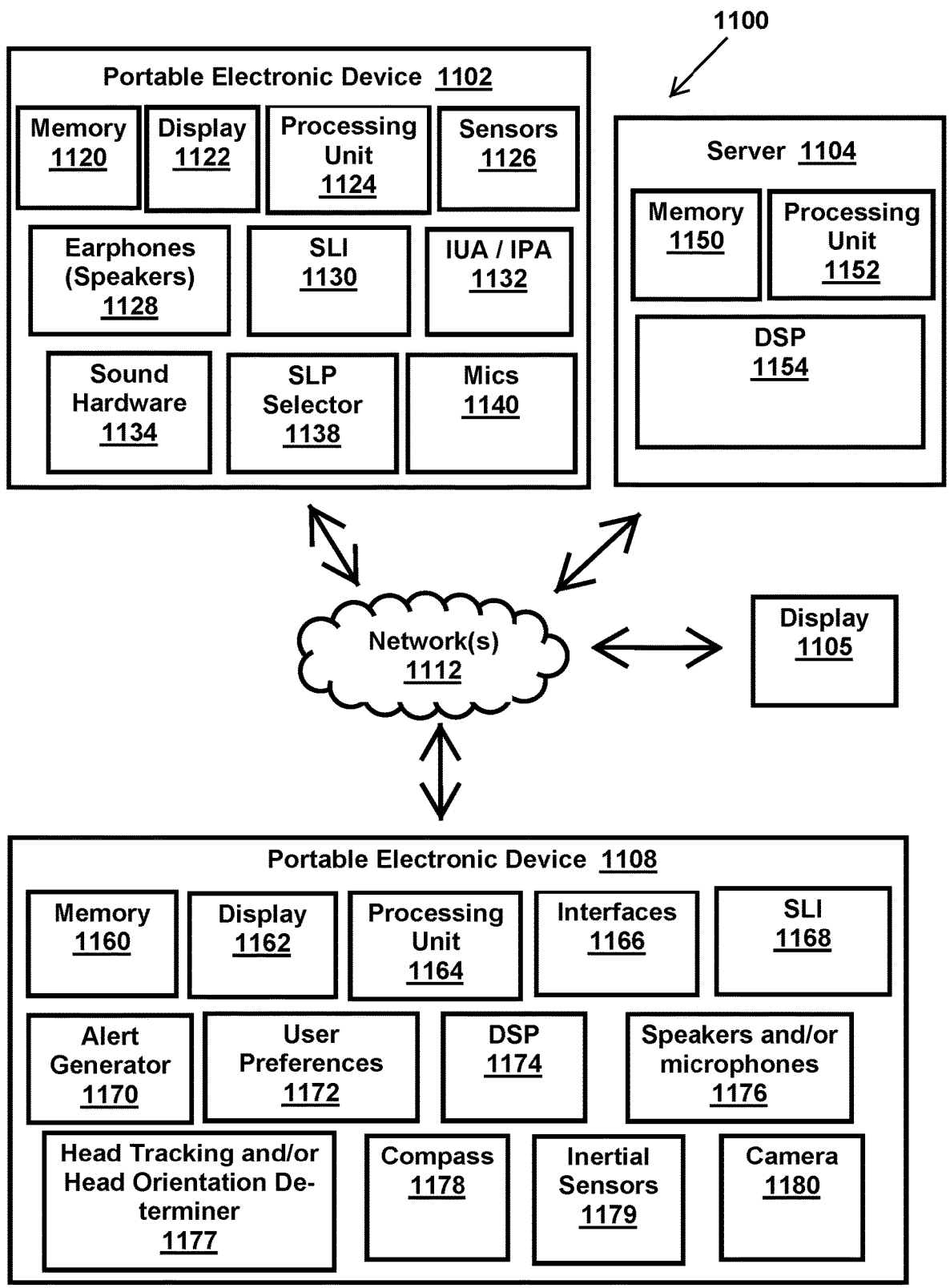
FIG. 11 is a computer system or electronic system in accordance with an example embodiment.

FIG. 11 is a computer system or electronic system in accordance with an example embodiment. The computer system 1100 includes one or more of a portable electronic device 1102, a server 1104, a portable electronic device 1108, and a display 1105 in communication with each other over one or more networks 1112.

Portable electronic device 1102 includes one or more components of computer readable medium (CRM) or memory 1120 (including cache memory), one or more displays 1122, a processor or processing unit 1124 (such as one or more microprocessors and/or microcontrollers), one or more sensors 1126 (such as a micro-electro-mechanical systems sensor, a proximity sensor, a biometric sensor, an optical sensor, a radio-frequency identification sensor, a global positioning satellite (GPS) sensor, a solid state compass, a gyroscope, a magnetometer, and/or an accelerometer), earphones with speakers 1128, sound localization information (SLI) 1130, an intelligent user agent (IUA) and/or intelligent personal assistant (IPA) 1132, sound hardware 1134, a SLP selector 1138, and one or more microphones or mics 1140.

Server 1104 includes computer readable medium (CRM) or memory 1150, a processor or processing unit 1152, and a DSP 1154 and/or other hardware to convolve audio in accordance with an example embodiment.

Portable electronic device 1108 includes computer readable medium (CRM) or memory 1160 (including cache memory), one or more displays 1162, a processor or processing unit 1164, one or more interfaces 1166 (such as interfaces discussed herein in FIG. 10), sound localization information 1168 (e.g., stored in memory), a an alert generator 1170, user preferences 1172, one or more digital signal processors (DSP) 1174, one or more of speakers and/or microphones 1176, head tracking and/or head orientation determiner 1177, a compass 1178, inertial sensors 1179 (such as an accelerometer, a gyroscope, and/or a magnetometer), and a camera 1180.

The alert generator 1170 generates an audio and/or visual alert to assist a listener in distinguishing between binaural electronic sound and physical environment sound. The alert generator and the sound localization point (SLP) selector include specialized hardware and/or software to execute example embodiments, such as selecting alerts, selecting a desired SLP for where binaural sound will localize to a user, and/or selecting coordinate locations of HRTFs being executed to convolve the sound.

A sound localization system (SLS), alert generator, and SLP selector include one or more of a processor, core, chip, microprocessor, controller, memory, specialized hardware, and specialized software to execute one or more example embodiments (including one or more methods discussed herein and/or blocks discussed in a method). By way of example, the hardware includes a customized integrated circuit (IC) or customized system-on-chip (SoC) to select, assign, and/or designate a SLP or a coordinate location for sound or convolve sound with SLI to generate binaural sound. For instance, an application-specific integrated circuit (ASIC) or a structured ASIC are examples of a customized IC that is designed for a particular use, as opposed to a general-purpose use. Such specialized hardware also includes field-programmable gate arrays (FPGAs) designed to execute a method discussed herein and/or one or more blocks discussed herein. For example, FPGAs are programmed to execute selecting, assigning, and/or designating SLPs and coordinate locations for sound or convolving, processing, or preprocessing sound so the sound externally localizes to the listener.

The sound localization system (SLS) performs various tasks with regard to managing, generating, interpolating, extrapolating, retrieving, storing, and selecting SLPs and coordinate locations and can function in coordination with and/or be part of the processing unit and/or DSPs or can incorporate DSPs. The SLS can also function to execute example embodiments to generate audio and/or visual alerts. Other tasks include, determining coordinates of SLPs and other coordinate locations and their corresponding HRTFs, switching and/or changing sound between binaural sound and mono sound or stereo sound, selecting SLPs and/or coordinate locations of HRTFs for a user, selecting objects to which sound will localize to a user, designating a type of sound, segment of audio, or sound source, providing binaural sound to users at a SLP, prefetching and/or preprocessing SLI, and executing one or more other blocks discussed herein. The sound localization system can also include a sound convolving application that convolves and de-convolves sound according to one or more audio impulse responses and/or transfer functions based on or in communication with head tracking.

In an example embodiment, the SLS calculates the line-of-sight or imaginary line from the head of the listener to an object designated as a SLP and retrieves SLI (including HRTFs) based on the location of the line. For instance, two points or locations determine a line. One point is located at the head of the listener. Information about the head orientation of the listener can be determined from or calculated from a camera or a head tracking and/or head orientation determiner (e.g., hardware and/or software in a head mounted display or other wearable electronic device). A second point is located at the origin of the sound, such as the object designated as a SLP. Information about the location of the second point can be determined from or calculated from a camera, a sensor, tag or RFID, or an electronic device. For instance, an electronic device calculates its position with respect to a head of the listener using one or more of a camera, facial recognition, a MEMS sensor (e.g., a multi-axis sensor with 9 degrees of freedom), wireless short-range communication with another electronic device (e.g., communication between an HPED and a wearable electronic device or electronic device in an Internet-of-Things (IoT) network), or other method.

By way of example, an intelligent personal assistant or intelligent user agent is a software agent that performs tasks or services for a person, such as organizing and maintaining information (such as emails, messaging (e.g., instant messaging, mobile messaging, voice messaging, store and forward messaging), calendar events, files, to-do items, etc.), initiating telephony requests (e.g., scheduling, initiating, and/or triggering phone calls, video calls, and telepresence requests between the user, IPA, other users, and other IPAs), responding to queries, responding to search requests, information retrieval, performing specific one-time tasks (such as responding to a voice instruction), file request and retrieval (such as retrieving and triggering a sound or video to play, or text or images to display), timely or passive data collection or information-gathering from persons or users (such as querying a user for information), data and voice storage, management and recall (such as taking dictation, storing memos, managing lists), memory aid, reminding of users, performing ongoing tasks (such as schedule management and personal health or finance management), and providing recommendations. By way of example, these tasks or services are based on one or more of user input, prediction, activity awareness, location awareness, an ability to access information (including user profile information and online information), user profile information, and other data or information.

By way of example, the sound hardware includes a sound card and/or a sound chip. A sound card includes one or more of a digital-to-analog (DAC) converter, an analog-to-digital (ATD) converter, a line-in connector for an input signal from a source of sound, a line-out connector, a hardware audio accelerator providing hardware polyphony, and one or more digital-signal-processors (DSPs). A sound chip is an integrated circuit (also known as a "chip") that produces sound through digital, analog, or mixed-mode electronics and includes electronic devices such as one or more of an oscillator, envelope controller, sampler, filter, and amplifier. The sound hardware can be or include customized or specialized hardware that processes and convolves mono and stereo sound into binaural sound.

By way of example, a computer and a portable electronic device include, but are not limited to, handheld portable electronic devices (HPEDs), wearable electronic glasses, smart glasses, watches, wearable electronic devices (WEDs) or wearables, smart earphones or hearables, voice control devices (VCD), voice personal assistants (VPAs), network attached storage (NAS), printers and peripheral devices, virtual devices or emulated devices (e.g., device simulators, soft devices), cloud resident devices, computing devices, electronic devices with cellular or mobile phone capabilities, digital cameras, desktop computers, servers, portable computers (such as tablet and notebook computers), smartphones, electronic and computer game consoles, home entertainment systems, digital audio players (DAPs) and handheld audio playing devices (example, handheld devices for downloading and playing music and videos), appliances (including home appliances), head mounted displays (HMDs), optical head mounted displays (OHMDs), personal digital assistants (PDAs), electronics and electronic systems in automobiles (including automobile control systems), combinations of these devices, devices with a processor or processing unit and a memory, and other portable and non-portable electronic devices and systems (such as electronic devices with a DSP and/or sound hardware as discussed herein).

The SLP selector and/or SLS can also execute retrieving SLI, preprocessing, predicting, and caching including, but not limited to, predicting an action of a user, predicting a location of a user, predicting motion of a user such as a gesture, a change in a head displacement and/or orientation, predicting a trajectory of a sound localization to a user, predicting an event, predicting a desire or want of a user, predicting a query of a user (such as a query to or response from an intelligent personal assistant), predicting and/or recommending a SLP, zone, predicting a suitable or optimal HRTF set for a user, or RIR/RTF to a user, etc. Such predictions can also include predicting user actions or requests in the future (such as a likelihood that the user or electronic device localizes a type of sound to a particular SLP or zone). For instance, determinations by a software application, hardware, an electronic device, and/or user agent are modeled as a prediction that the user will take an action and/or desire or benefit from moving or muting a SLP, from delaying the playing of a sound, from a switch between binaural, mono, and stereo sounds or a change to binaural sound (such as pausing binaural sound, muting binaural sound, selecting an object at which to localize sound, reducing or eliminating one or more cues or spatializations or localizations of binaural sound). For example, an analysis of historical events, personal information, geographic location, and/or the user profile provides a probability and/or likelihood that the user will take an action (such as whether the user prefers a particular SLP or zone as the location for where sound will localize, prefers binaural sound or stereo, or mono sound for a particular location, prefers a particular listening experience, or a particular communication with another person or an intelligent personal assistant). By way of example, one or more predictive models execute to predict the probability that a user would take, determine, or desire the action. The predictor also predicts future events unrelated to the actions of the user including, but not limited to, a prediction of times, locations, or identities of incoming callers or virtual sound source requests for sound localizations to the user, a type or quality of inbound sound, predicting a sound source or virtual sound source path including a change in orientation of the sound source or virtual sound source or SLP such as a change in a direction of source emission of the SLP.

Example embodiments are not limited to HRTFs but also include other sound transfer functions and sound impulse responses including, but not limited to, head related impulse responses (HRIRs), room transfer functions (RTFs), room impulse responses (RIRs), binaural room impulse responses (BRIRs), binaural room transfer functions (BRTFs), headphone transfer functions (HPTFs), etc.

Examples herein can take place in physical spaces, in computer rendered spaces (such as computer games or VR), in partially computer rendered spaces (AR), and in combinations thereof.

The processor unit includes a processor (such as a central processing unit, CPU, microprocessor, microcontrollers, field programmable gate arrays (FPGA), application-specific integrated circuits (ASIC), etc.) for controlling the overall operation of memory (such as random access memory (RAM) for temporary data storage, read-only memory (ROM) for permanent data storage, and firmware). The processing unit and DSP communicate with each other and memory and perform operations and tasks that implement one or more blocks of the flow diagrams discussed herein. The memory, for example, stores applications, data, programs, algorithms (including software to implement or assist in implementing example embodiments) and other data.

Consider an example embodiment in which the SLS includes an integrated circuit FPGA that is specifically customized, designed, configured, or wired to execute one or more blocks discussed herein. For example, the FPGA includes one or more programmable logic blocks that are wired together or configured to execute combinational functions for the SLS (e.g., changing between binaural sound and mono sound upon detecting rotation of the HPED or detecting another action discussed herein).

Consider an example in which the SLS includes an integrated circuit or ASIC that is specifically customized, designed, or configured to execute one or more blocks discussed herein. For example, the ASIC has customized gate arrangements for the SLS. The ASIC can also include microprocessors and memory blocks (such as being a SoC (system-on-chip) designed with special functionality to execute functions of the SLS and/or blocks of methods discussed herein).

Consider an example in which the SLS includes one or more integrated circuits that are specifically customized, designed, or configured to execute one or more blocks discussed herein. For example, the electronic devices include a specialized or customized processor or microprocessor or semiconductor intellectual property (SIP) core or digital signal processor (DSP) with a hardware architecture optimized for convolving sound and executing one or more example embodiments.

Consider an example in which the HPED includes a customized or dedicated DSP that executes one or more blocks discussed herein (including processing and/or convolving sound into binaural sound). Such a DSP has a better power performance or power efficiency compared to a general-purpose microprocessor and is more suitable for a HPED, such as a smartphone, due to power consumption constraints of the HPED. The DSP can also include a specialized hardware architecture, such as a special or specialized memory architecture to simultaneously fetch or prefetch multiple data and/or instructions concurrently to increase execution speed and sound processing efficiency. By way of example, streaming sound data (such as sound data in a telephone call or software game application) is processed and convolved with a specialized memory architecture (such as the Harvard architecture or the Modified von Neumann architecture). The DSP can also provide a lower-cost solution compared to a general-purpose microprocessor that executes digital signal processing and convolving algorithms. The DSP can also provide functions as an application processor or microcontroller.

Consider an example in which a customized DSP includes one or more special instruction sets for multiply-accumulate operations (MAC operations), such as convolving with transfer functions and/or impulse responses (such as HRTFs, HRIRs, BRIRs, et al.), executing Fast Fourier Transforms (FFTs), executing finite impulse response (FIR) filtering, and executing instructions to increase parallelism.

Consider an example in which the DSP includes the SLP selector. For example, the SLP selector and/or the DSP are integrated onto a single integrated circuit die or integrated onto multiple dies in a single chip package to expedite binaural sound processing.

Consider another example in which HRTFs (such as a custom or personal set of HRTFs created for a certain user or users, or other transfer functions or impulse responses) are stored or cached in the DSP memory or local memory relatively close to the DSP to expedite binaural sound processing.

Consider an example in which a smartphone or other PED includes one or more dedicated sound DSPs (or dedicated DSPs for sound processing, image processing, and/or video processing). The DSPs execute instructions to convolve sound and display locations of images or SLPs for the sound on a user interface of a HPED. Further, the DSPs simultaneously convolve multiple sound sources or SLPs to a user. These sound sources or SLPs can be moving with respect to the face of the user so the DSPs convolve multiple different sound signals and virtual sound sources with HRTFs that are continually, continuously, or rapidly changing.

In FIGS. 10 and 11, memory in the portable electronic devices and/or server can store executable instructions and/or applications, such as instructions to generate and provide alerts or execute other example embodiments.

As used herein, the word "about" when indicated with a number, amount, time, etc. is close or near something. By way of example, for spherical or polar coordinates of a SLP (r, θ, φ), the word "about" means plus or minus (±) three degrees for θ and φ and plus or minus 5% for distance (r).

As used herein, "electronically generated binaural sound" or "electronic binaural sound" or "AR sound" is sound that is processed or convolved with an electronic device and/or processor to externally localize as binaural sound or binaural audio to a listener.

As used herein, "empty space" is a location that is not occupied by a tangible object.

As used herein, "field-of-view" is the observable world that is seen at a given moment. Field-of-view includes what a user or camera sees in a virtual or augmented world (e.g., what the user sees while wearing a HMD or OHMD).

As used herein, "line-of-sight" is a line from an observer's eye to a location.

As used herein, "physical environment sound" or "PE sound" is sound generated in a physical environment of a listener without an electronic device, such as a voice of a person or sound from an object dropped on the floor. Physical environment sound also includes sound generated in a physical environment of a listener with an electronic device when this sound is not convolved or processed with an electronic device into binaural sound, such as sound from a honking horn of a car or TV or radio playing.

As used herein, "proximate" means near. For example, a sound that localizes proximate to a listener occurs within two meters of the person.

As used herein, "sound localization information" or "SLI" is information that an electronic device uses to process or convolve sound so the sound externally localizes as binaural sound to a listener. Examples of SLI include head related transfer functions (HRTFs), head related impulse responses (HRIRs), binaural room impulse responses (BRIRs), room impulse responses (RIRs), interaural level differences (ILDs), and interaural time differences (ITDs).

As used herein, a "sound localization point" or "SLP" is a location where a listener localizes sound. A SLP can be internal (such as monaural sound that localizes inside a head of a listener wearing headphones or earbuds), or a SLP can be external (such as binaural sound that externally localizes to a point or an area that is away from but proximate to the person or away from but not near the person). A SLP can be a single point such as one defined by a single pair of HRTFs or a SLP can be a zone or shape or volume or general area, such as a line or a cylindrical volume. Further, in some instances, multiple impulse responses or transfer functions can process or convolve sounds to a place within the boundary of the SLP. In some instances, HRTFs necessary to produce a particular SLP for a particular user may not have been created. A HRTF may not be required to provide a SLP or localize sound for a user, such as for an internalized SLP, or a SLP may be rendered by adjusting an ITD and/or ILD or other human audial cues.

As used herein, "spherical coordinates" or "spherical coordinate system" provides a coordinate system in 3D space in which a position is given with three numbers: a radial distance (r) from an origin, an azimuth angle (θ) of its orthogonal projection on a reference plane that is orthogonal to the zenith direction and that passes through the origin, and an elevation or polar angle (φ) that is measured from the zenith direction.

As used herein, a "telephone call," or a "phone call" or "telephony" is a connection over a wired and/or wireless network between a calling person or user and a called person or user. Telephone calls can use landlines, mobile phones, satellite phones, HPEDs, voice personal assistants (VPAs), computers, and other portable and non-portable electronic devices. Further, telephone calls can be placed through one or more of a public switched telephone network, the internet, and various types of networks (such as Wide Area Networks or WANs, Local Area Networks or LANs, Personal Area Networks or PANs, home area networks or HAMs, Campus Area Networks or CANs, etc.). Telephone calls include other types of telephony including Voice over Internet Protocol (VoIP) calls, video calls, conference calls, internet telephone calls, in-game calls, telepresence, etc.

As used herein, "three-dimensional space" or "3D space" is space in which three values or parameters are used to determine a position of an object or point. For example, binaural sound can localize to locations in 3D space around a head of a listener. 3D space can also exist in virtual reality (e.g., a user wearing a HMD can see a virtual 3D space).

As used herein, "trans-dimensional sound" is sound that includes electronic binaural sound and at least one of stereo sound and mono sound.

As used herein, a "user" or a "listener" is a person (i.e., a human being). These terms can also be a software program (including an IPA or IUA), hardware (such as a processor or processing unit), an electronic device or a computer (such as a speaking robot or avatar shaped like a human with microphones or points of virtual microphones in or at its ears).

As used herein, a "video call" is a telephone call in which one or more people to the video call see video of the other person.

Impulse responses can be transformed into their respective transfer functions. For example, a RIR has an equivalent transfer function of a RTF; a BRIR has an equivalent transfer function of a BRIR; and a H RIR has an equivalent transfer function of a HRTF.

In some example embodiments, the methods illustrated herein and data and instructions associated therewith, are stored in respective storage devices that are implemented as computer-readable and/or machine-readable storage media, physical or tangible media, and/or non-transitory storage media. These storage media include different forms of memory including semiconductor memory devices such as NAND flash non-volatile memory, DRAM, or SRAM, Erasable and Programmable Read-Only Memories (EPROMs), Electrically Erasable and Programmable Read-Only Memories (EEPROMs), solid state drives (SSD), and flash memories; magnetic disks such as fixed and removable disks; other magnetic media including tape; optical media such as Compact Disks (CDs) or Digital Versatile Disks (DVDs). Note that the instructions of the software discussed above can be provided on computer-readable or machine-readable storage medium, or alternatively, can be provided on multiple computer-readable or machine-readable storage media distributed in a large system having possibly plural nodes. Such computer-readable or machine-readable medium or media is (are) considered to be part of an article (or article of manufacture). An article or article of manufacture can refer to a manufactured single component or multiple components.

Blocks and/or methods discussed herein can be executed and/or made by a user, a user agent (including machine learning agents and intelligent user agents), a software application, an electronic device, a computer, firmware, hardware, a process, a computer system, and/or an intelligent personal assistant. Furthermore, blocks and/or methods discussed herein can be executed automatically with or without instruction from a user.

The methods in accordance with example embodiments are provided as examples, and examples from one method should not be construed to limit examples from another method. Tables and other information show example data and example structures; other data and other database structures can be implemented with example embodiments. Further, methods discussed within different figures can be added to or exchanged with methods in other figures. Further yet, specific numerical data values (such as specific quantities, numbers, categories, etc.) or other specific information should be interpreted as illustrative for discussing example embodiments. Such specific information is not provided to limit example embodiments.

What is claimed is:

1. A method comprising:
displaying, with a display of a wearable electronic device (WED) worn on a head of a user, virtual images;
processing sounds that externally localize as electronic binaural sound to the user at the virtual images;
detecting, with the WED, a voice of a person in a physical environment with the user; and
alerting the user that the voice of the person originates in the physical environment and not from the virtual images by displaying a visual alert with the display of the WED.

2. The method of claim 1 further comprising:
repeating the visual alert to remind the user that the voice of the person originates in the physical environment, wherein the virtual images are augmented reality (AR) images or virtual reality (VR) images.

3. The method of claim 1 further comprising:
alerting the user that the voice of the person originates in the physical environment and not from the virtual images by providing a tactile alert to the user that includes a vibration.

4. The method of claim 1 further comprising:
determining, with the WED, a direction of the voice; and
displaying the visual alert to notify the user of the direction of the voice.

5. The method of claim 1 further comprising:
displaying, with the WED, the visual alert at a coordinate location on the display that corresponds to a location of where the person is located in the physical environment.

6. The method of claim 1 further comprising:
continuing to display the visual alert while the WED continues to detect the voice of the person in the physical environment; and
ceasing to display the visual alert when the WED ceases to detect the voice of the person in the physical environment.

7. The method of claim 1 further comprising:
alerting the user that the voice of the person originates in the physical environment and not from the virtual images by playing an audio alert to the user in response to detecting the voice of the person in the physical environment with the WED.

8. A method comprising:
displaying, with an electronic device with a user, a virtual image;
processing, with a processor, a voice of the virtual image so the voice of the virtual image externally localizes as binaural sound to the user at the virtual image; and
displaying, with the electronic device with the user and in response to detecting a voice of a person in a physical environment of the user, a visual alert that notifies the user that the voice of the person originates in the physical environment and not from the virtual image.

9. The method of claim 8 further comprising:
repeating the visual alert while continuing to detect the voice of the person in the physical environment of the user.

10. The method of claim 8 further comprising:
ceasing to display the visual alert upon not further detecting the voice of the person in the physical environment of the user.

11. The method of claim 8 further comprising:
displaying, with the electronic device and to the user, an indication that shows where the person is located in the physical environment.

12. The method of claim 8 further comprising:
playing a repeating sound to provide an audio alert that notifies the user that the voice of the person originates in the physical environment and not from the virtual image.

13. The method of claim 8 further comprising:
deactivating the visual alert when the person in the physical environment is not speaking such that the visual alert activates when the person is speaking and deactivates when the person is not speaking.

14. The method of claim 8 further comprising:
displaying the visual alert as a virtual image that represents the person in the physical environment.

15. The method of claim 8 further comprising:
displaying the visual alert as a flashing light while the person is speaking to visually alert the user when the person is speaking.

16. A wearable electronic device (WED) comprising:
a display that displays a virtual image to a user wearing the WED;
speakers that play binaural sound that originates to the user from the virtual image; and
one or more sensors that detect a voice of a person in a physical environment of the user wearing the WED,
wherein the display displays a visual alert that notifies the user that the voice of the person originates in the physical environment and not from the virtual image.

17. The WED of claim 16, wherein the speakers play an audio alert that notifies the user that the voice of the person originates in the physical environment and not from the virtual image.

18. The WED of claim 16, wherein the visual alert is a light that activates while the person in the physical environment is talking and deactivates when the person in the physical environment stops talking.

19. The WED of claim 16, wherein the visual alert is a three-dimensional (3D) virtual image that moves while the person is talking and stops moving when the person stops talking.

20. The WED of claim 16, wherein the WED is a head mounted display (HMD) worn on a head of the user, and the one or more sensors include a microphone in the WED.

* * * * *